United States Patent
Kraan Brun et al.

(10) Patent No.: US 11,416,318 B1
(45) Date of Patent: Aug. 16, 2022

(54) APPLICATION PROGRAMMING INTERFACE FOR INTEGRATION FLOW DESIGN

(71) Applicant: salesforce.com, inc., San Francisco, CA (US)

(72) Inventors: Pablo Gerardo Kraan Brun, Buenos Aires (AR); Federico Ariel Piagentini, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/200,430

(22) Filed: Mar. 12, 2021

(51) Int. Cl.
*G06F 9/54* (2006.01)
*G06F 11/36* (2006.01)

(52) U.S. Cl.
CPC .......... *G06F 9/547* (2013.01); *G06F 11/3644* (2013.01)

(58) Field of Classification Search
CPC ........ G06F 9/541; G06F 8/20; G06F 9/44505; G06F 8/433; G06F 8/34
See application file for complete search history.

(56) References Cited

U.S. PATENT DOCUMENTS

| | | | |
|---|---|---|---|
| 2021/0218622 A1* | 7/2021 | Kulkarni | H04L 41/5054 |
| 2021/0264333 A1* | 8/2021 | Xing | H04L 47/808 |
| 2021/0334146 A1* | 10/2021 | Kulkarni | G06F 8/433 |
| 2022/0038367 A1* | 2/2022 | Devta | H04L 45/745 |
| 2022/0092481 A1* | 3/2022 | Neithalath | G06N 5/04 |

* cited by examiner

*Primary Examiner* — Brian W Wathen
(74) *Attorney, Agent, or Firm* — Holland & Hart LLP

(57) ABSTRACT

Approaches for data processing are described that include initializing a plurality of compute instances configured to support a design session for an integration flow, receiving, from a client, an application programming interface (API) request at an API, the API request including one or more design parameters associated with the integration flow, provisioning, for the design session and from the plurality of initialized compute instances, one or more compute instances based on the one or more design parameters, evaluating an integration flow configuration associated with the integration flow, the evaluating based on the one or more design parameters, and terminating the one or more compute instances upon completion of the design session.

20 Claims, 12 Drawing Sheets

APPLICATION PROGRAMMING INTERFACE FOR INTEGRATION FLOW DESIGN

FIELD OF TECHNOLOGY

The present disclosure relates generally to database systems and data processing, and more specifically to application programming interface for integration flow design.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some examples, the cloud platform may provide services for a user to create an integration flow. An integration flow may connect various data sources, internal services, external services, and other elements with triggers, transformations, analyses, and other actions. The design, creation, and evaluation of this integration flow is supported by resources coordinated and provided by the cloud platform, including compute instances. However, identifying and provisioning such resources may be cumbersome and time consuming. In addition, such a provisioning scheme may be inefficient in its use of available resources while being used, and resources may be left idle for extended periods of time even after a user is no longer designing an integration flow.

DETAILED DESCRIPTION

Figure 1:
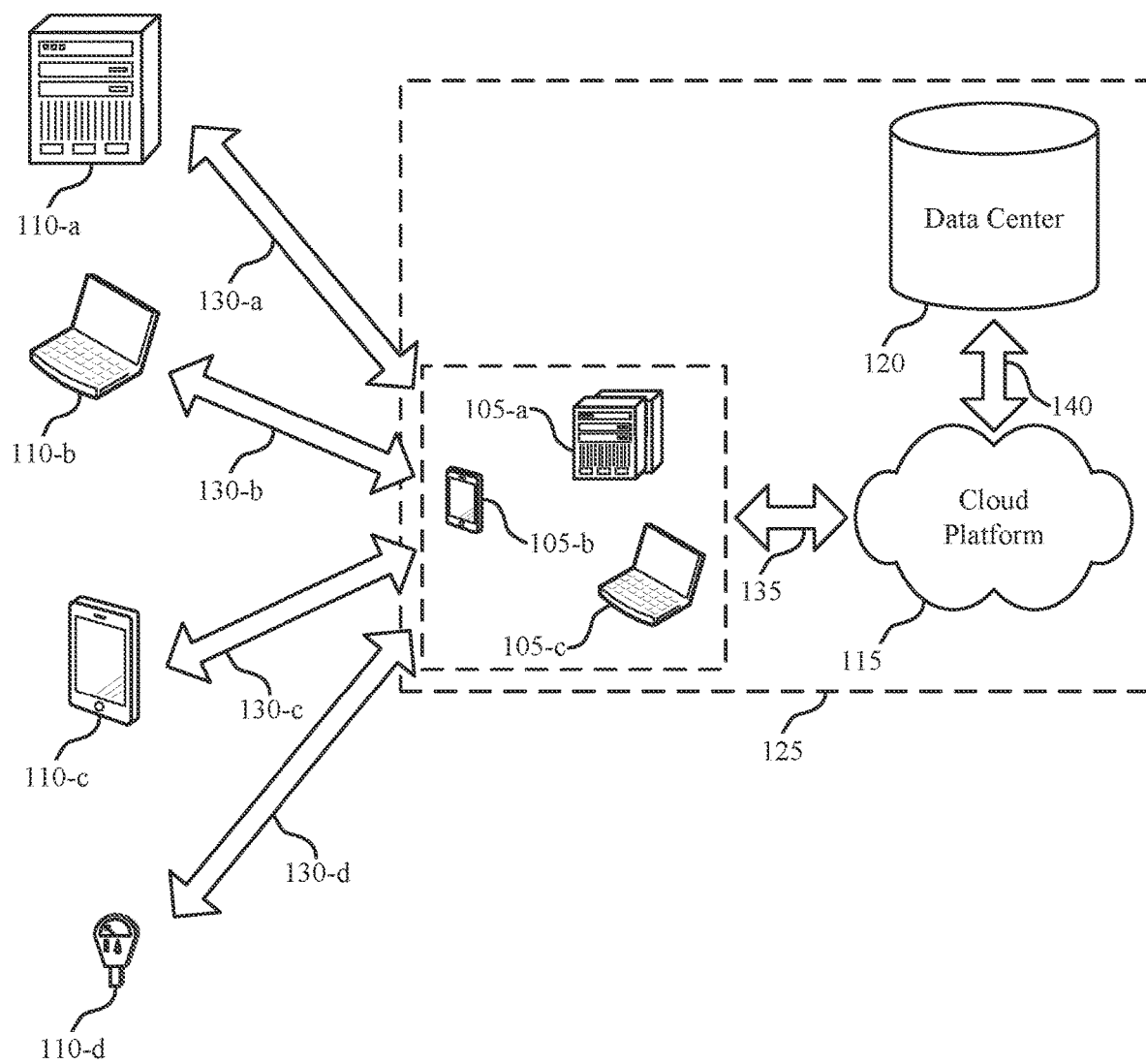
FIG. 1 illustrates an example of a system that supports an application programming interface for integration flow design in accordance with aspects of the present disclosure.

Design and creation of an integration flow may be offered by an application server, a database server, a local machine, or other platform accessible to a user. This may allow a user to easily connect various services, data sources, and other elements together to create custom workflows that meet the user's needs. For example, a user may have data stored in a location that she wishes to be processed, connected with additional data from other services, analyzed, aggregated, and sent to another external service. Thus, this user may initiate a design session on the application server and design an integration flow that includes various triggers, data transformations, metadata, and other elements. For example, a trigger may execute when additional data is received at the user's data storage that initiates the integration flow. Once the trigger is executed, the user data received at the data storage may be retrieved and stored on an application server to be processed. The user data may then be transformed by the application server into another type of data, reorganized, analyzed, or otherwise processed. Additional data may be retrieved to be processed alongside the user's data. Metadata associated with an external service may be retrieved from the external service, so that the user data may be properly formatted, organized, or processed to be used with the external service. The user data may then be sent to the external service for further processing. Once processed by the external service, the user data may be retrieved once again and stored at the application server and subsequently transmitted back to the user's data storage location, thus completing an integration flow. This scenario is only exemplary in nature and does not limit the scope of the subject matter discussed herein.

However, when one is designing an integration flow on an application server, various resources may be used to design, run, evaluate, and manage the integration flow. For example, one or more compute instances (e.g., dedicated hardware) may be used to design the integration flow or evaluate the integration flow to see whether the integration flow as designed is configured correctly to meet the user's design parameters. In most cases, identifying and provisioning such resources for a design session may be cumbersome and time consuming. Existing solutions for resource management and uptime maintenance may be inadequate or incapable of meeting the requirements for integration flow design sessions.

For example, in the course of designing an integration flow, certain applications may be required to carry out user requests, and additional resources, such as classloaders, may need to be deployed to contain resources that may be listed as dependencies. Such approaches may be sensitive to memory leaks, in particular when large memory footprints are present. Memory leaks due to these or other reasons may make compute instances slow or unresponsive, and must be restarted, introducing further delays in provisioning and using the compute instances. Further, in some situations, including situations where use of compute instances is limited, compute instances may become large in size. Increasing the usage of a worker in this or other ways may impact the time required for the compute instance to complete a request, slowing down data processing tasks.

In addition, such a provisioning scheme may be inefficient in its use of resources and some resources may be under-utilized under some circumstances during design of an integration flow. For example, a compute instance may be assigned to each design session being run by a user, and, depending on the circumstances, this single compute instance may be used very little during the design session. Such a one-to-one correspondence between a resource and a design session may be inefficient and wasteful. Also, due to the extended times that often occurs for provisioning of resources, these resources may be left idle for extended periods of time even after a user is no longer actively designing an integration flow. In some cases, by running a project for an extended amount of time may inadvertently consume a user's API quota, and the user must wait for a period of time or restore their quote before continuing the project.

Techniques described herein include support of a pool of resources that may be initiated before a user starts a design session to reduce delays in resource provisioning. Instead of a one-to-one provisioning model where a single compute instance or other form of dedicated hardware is assigned to a single design session on a more permanent basis, a scheme with a pool of compute instances that are ready to be dynamically assigned to design sessions is used. In some examples, a server or service running on a cloud architecture, an application server, database server, local machine, or other platform may be configured to initialize, provision, and terminate compute instances or other resources as needed to support the design, creation, evaluation, and management of integration flows. In some examples, the compute resources assigned to a design session may be an example of a serverless computing architecture. In some examples, compute resources assigned to a design session may be run on a serverless architecture, on private computing resources, or a combination thereof. In some examples, the compute instances may also be referred to as workers, or by other terms. The compute instances may be individual, physical machines, or they may include one or more virtual machines running on one or more servers. The compute instances may also be implemented using processes, scripts, operating systems, or in other ways. The compute instances may handle data processing tasks that support the design, creation, evaluation, and management of integration flows.

An application programming interface (API) may be used to facilitate this functionality. In some examples, a pool of compute instances may be initialized for supporting a design session for an integration flow. An API request may be received by an API, and the request may contain design parameters for the integration flow to be created. One or more compute instances may be provisioned for the design session, the compute instances coming from the already initialized pool of compute instances. In some examples, the computer instances may already be configured and pre-warmed up. A configuration of the integration flow may be evaluated based on the design parameters included in the API request. Once the design session is completed, the compute instances provisioned for the design session may be terminated.

Some examples of the subject matter discussed herein may include initializing additional compute instances to replace the one or more terminated compute instances and associating the replacement instances with the plurality of compute instances. Some examples of the subject matter discussed herein include determining a minimum number of compute instances to maintain in the plurality of compute instances. In some examples, this determination may be based on an initialization time of one or more additional compute instances. Some examples of the subject matter discussed herein includes scaling in and out of compute instances provisioned for the design session. Additional examples may include various techniques for evaluating an integration flow, such as connectivity testing, metadata retrieval, data transformation evaluation, metadata determination, error identification and reports, debugging, and exposure of an API endpoint for evaluation of the integration flow.

Aspects of the disclosure are initially described in the context of an environment supporting an on-demand database service. Aspects of the disclosure also described by architecture diagrams of systems and process flow diagrams relating to an API for an integration flow design. Aspects of the disclosure are further illustrated by and described with reference to apparatus diagrams, system diagrams, and flowcharts that relate to application programming interface for integration flow design.

FIG. 1 illustrates an example of a system 100 for cloud computing that supports application programming interface for integration flow design in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some examples, the subsystem 125 may be configured to initialize a plurality of compute instances configured to support a design session for an integration flow. This plurality of compute instances may be initialized and ready to be utilized in support of the various functions and processing tasks that may be included in a design session for an integration flow. In some examples, the subsystem 125 may be configured to receive an API request (e.g., instructions, commands, or other information sent to an API in the normal course of operating the API) at an endpoint of an API that is supported by the subsystem 125. In some examples, the endpoint may be the primary point of contact for interfacing with the API through which API requests are sent. This endpoint may be configured to receive API requests that include design parameters for an integration flow. In some examples, the API request may be sent by the cloud clients 105, by the contacts 110, or by another client. The subsystem 125 may be further configured to provision one or more compute instances for the design session. These compute instances may be provisions from the plurality of all already initialized compute instances, and this provision may be based on the design parameters received through the API. The subsystem 125 may also support evaluation of the configuration of the integration flow, which may be based on the design parameters received for the API. Once the design session is completed, the subsystem 125 may then terminate the compute instances that were provisioned for the design session.

In some systems that provide services for an integration flow, compute instances may be assigned on a one-to-one basis with design sessions. In such systems, a user may need to utilize their own hardware or utilize a dedicated hardware or compute instance for their individual design session. In such systems these compute instances are provisioned once a design session is started, and provisioning in this way introduces significant delays. In addition, the resources assigned to the design sessions may be underutilized, and these resources may be wasted. Further, the compute instances assigned to the design sessions may be left running for extended amounts of time, even when not being used. This may happen because of the large amounts of time invested in provisioning the compute instances in the first place, despite the inefficiencies of leaving provisioned compute instances running even when not engaged in a design session. In addition, excess CPU consumption, memory leaks, and instability may also rise by using such a provisioning approach.

The subject matter described herein may prescribe rules and configurations for provisioning compute instances to support design sessions for integration flows. Techniques described herein may include initializing a number of compute instances, in some cases even before a design session is started, to avoid long provisioning times present in other approaches. API requests may be received from a client that deliver design parameters associated with an integration flow being designed in a design session. Based on these design parameters, one or more compute instances may be provisioned for the design session. For example, the design parameters could indicate that the integration flow to be created may include a large amount of data to be processed. As a result, a selection of one or more compute instances capable of handling large amounts of data (i.e., has access to large amounts of memory) could be utilized, as evaluation of such an integration flow with large amounts of data could require large amounts of memory. In another example, design session parameters could indicate that large amounts of metadata must be calculated, and therefore compute instances capable of computing such metadata may be required. Evaluation of an integration flow configuration associated with the integration flow may also be performed based on the design parameters received through the API request. The techniques herein may also include terminating the compute instances provisioned to support the design session upon completion of the design session. In addition, in a situation where a compute instances becomes "unhealthy" and does not perform as expected, the compute instance may be terminated and replaced with a compute instance that was pre-warmed or pre-initialized and available for use, and any associated states may be updated to reflect such a change.

In this way, the long provisioning times present in other approaches may be resolved. Also, the undesirable aspects of other approaches such as wasted resources during processing, as well as excessive lags in terminating compute instances due to the difficulty in provisioning them in the first place, may be avoided. Other effects such as excess CPU consumption, memory leaks, and instability may also be resolved through the techniques described herein.

In some examples where a user may work on an integration flow over an extended amount of time, various resources may be used and discarded (e.g. compute instances may be provisioned and terminated) over the extended amount of time. However, the "stickiness" of the user's session or work may be maintained by maintaining an association between the user and a design session, project, or integration flow, even though various resources may come and go over the course of the user's work. In some examples, an API may operate with states that may maintain an association between the user and a design session, project, or integration flow.

Further, security for users, projects, design sessions, machines, or other resources may also be maintained. For example, requests made may be isolated from each other, and resources (such as compute instances or other available resources) may only be shared when security may be maintained. In some examples, a request, the design session, available resources (e.g., compute instances), or a combination thereof may be analyzed to determine whether data processing tasks may be executed in a shared environment. Rules, configurations, or parameters may be configured and utilized to assure that a compute instance is only used by one user at a time, to maintain security. Further, destruction or termination of various resources (including compute instances) may be utilized to ensure that design sessions, applications, projects, and data processing tasks operate in environments that may be isolated from other environments, thus increasing security.

In one example, the cloud platform 115 may initialize a number of compute instances configured to support a design session for an integration flow, in some cases even before a cloud client 105 initiates any requests related to the design session or integration flow creation. Thus, when a cloud client 105 wishes to initiate a design session for an integration flow using an API that is supported by the cloud platform 115, a cloud client 105 may send an API request that contains one or more design parameters for the integration flow. The cloud platform 115 may then provision one or more compute instances from the already initialized compute instances to support the design session for the cloud client 105. The cloud client 105 may also wish to evaluate the integration flow created in the design session, and the cloud platform 115 may support such an evaluation of a configuration for the integration flow based on the design parameters received through the API request. In some examples, once the cloud client 105 completes the design session, the cloud platform 115 may then terminate the compute instances used to support the design session of the cloud client 105. In this way, the technical challenges related to provisioning of compute instance is present in other approaches may be resolved.

It should be appreciated by a person skilled in the art that one or more aspects of the disclosure may be implemented in a system 100 to additionally or alternatively solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
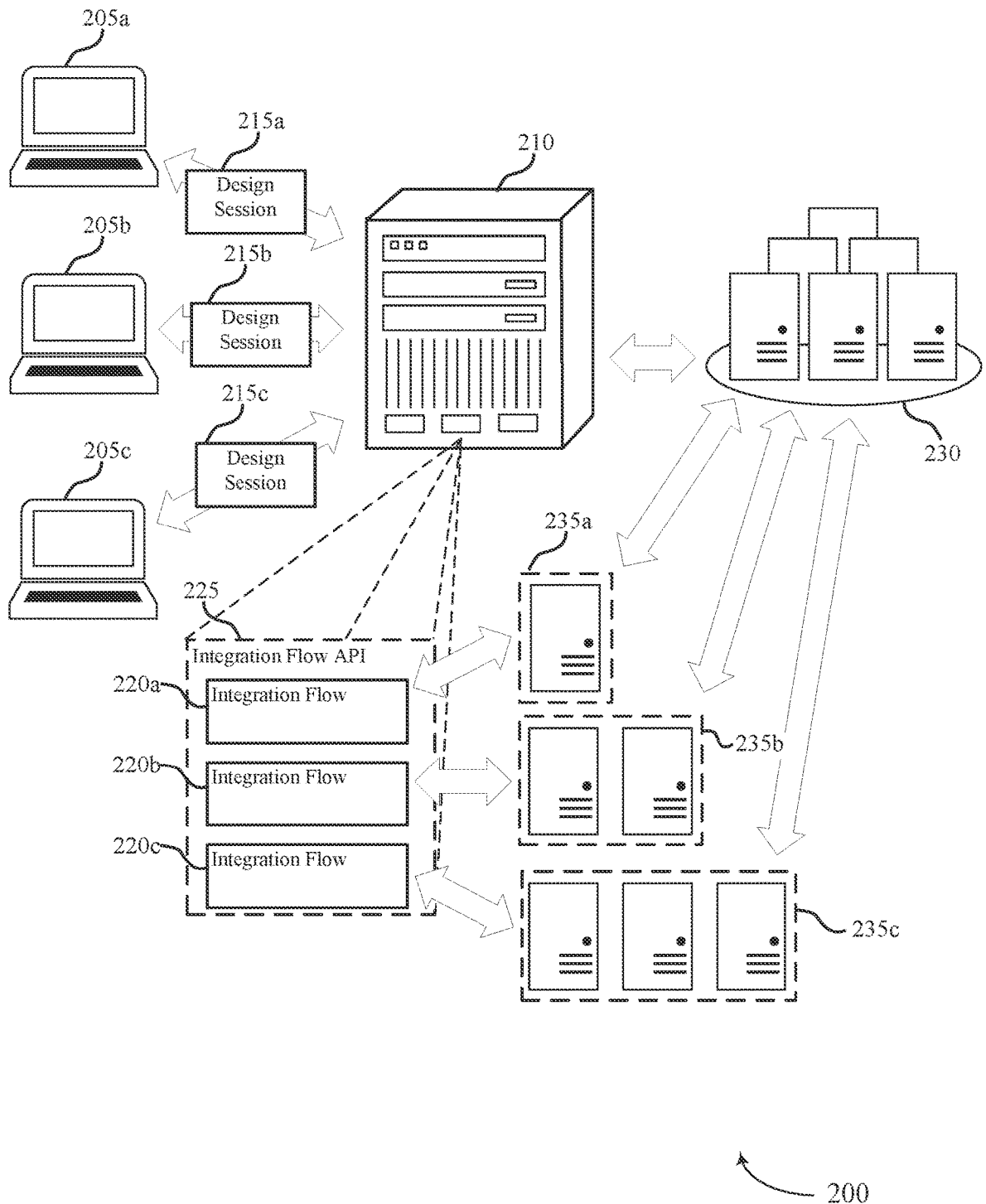
FIG. 2 illustrates an example of an architecture diagram of a system that supports an application programming interface for integration flow design in accordance with aspects of the present disclosure.

FIG. 2 illustrates an example of a an architecture diagram of a system 200 that supports application programming interface for integration flow design in accordance with aspects of the present disclosure. The system 200 may include clients 205a, 205b, and 205c. The clients 205 may be any appropriate device capable of communicating with other devices such as a laptop computer, desktop computer, server, virtual machine, or other device. In some examples, the client 205 is associated with a tenant of a multi-tenant database system. In such examples, the client 205 may communicate with a server 210 that is also associated with the multi-tenant database system.

The server 210 may support design sessions 215a, 215b, and 215c that may be initiated by the clients 205. The design sessions 215a, 215b, and 215c may be associated with clients 205a, 205b, and 205c, respectively. The design sessions 215a, 215b, and 215c may also be associated with creation, modification, design, or other operations associated with integration flows 220a, 220b, and 220c. The integration flows 220a, 220b, and 220c may be associated with design sessions 215a, 215b, and 215c and clients 205a, 205b, and 205c, respectively. The integration flows 220a, 220b, and 220c may allow the clients 205 to easily connect various services, data sources, and other elements together to create custom workflows and solutions that meet the user's needs, as described in more detail herein.

In some examples, the server 210 may also support an integration flow API 225 through which the clients 205 may interface with the design sessions 215 and the integration flows 220. The integration flow API 225 may receive API requests from the clients 205 associated with the design sessions 215 and the integration flows 220. A plurality of compute instances 230 for supporting the design sessions 215 and the integration flows 220 may also be initialized. Initialization of the plurality of compute instances 230 may be handled by the integration flow API in some examples, while in other examples the initialization may be handled by another aspect of the server 210 or by other means.

For each design session 215, one or more compute instances may be provisioned based on design parameters received by the integration flow API 225 or by other means. For example, the provisioned compute instances 235a, 235b, and 235c may be associated with their respective integration flows 220a, 220b, and 220c. Different numbers of provisioned compute instances 235 may be assigned to the integration flows 220 depending on the needs of the integration flows 220 and the received design parameters, among other factors. As shown in FIG. 2, provisioned compute instance 235a includes one compute instance, provisioned compute instances 235b includes two compute instances, and provisioned compute instances 235c includes three compute instances.

As shown in FIG. 2 and described herein, the server 210, the integration flow API 225, and other elements depicted herein are capable of supporting multiple clients 205 and multiple design sessions 215 for multiple integration flows 220. The server 210 and the integration flow API 225 may include multi-tenant capabilities, rules, and configurations to achieve the support of multiple clients 205. The arrangements provided in FIG. 2 and described herein are provided as non-limiting examples to illustrate this and other aspects of the subject matter described herein. The server 210 and integration flow API 225 may support any number of clients 205, design sessions 215, and integration flows 220.

Figure 3:
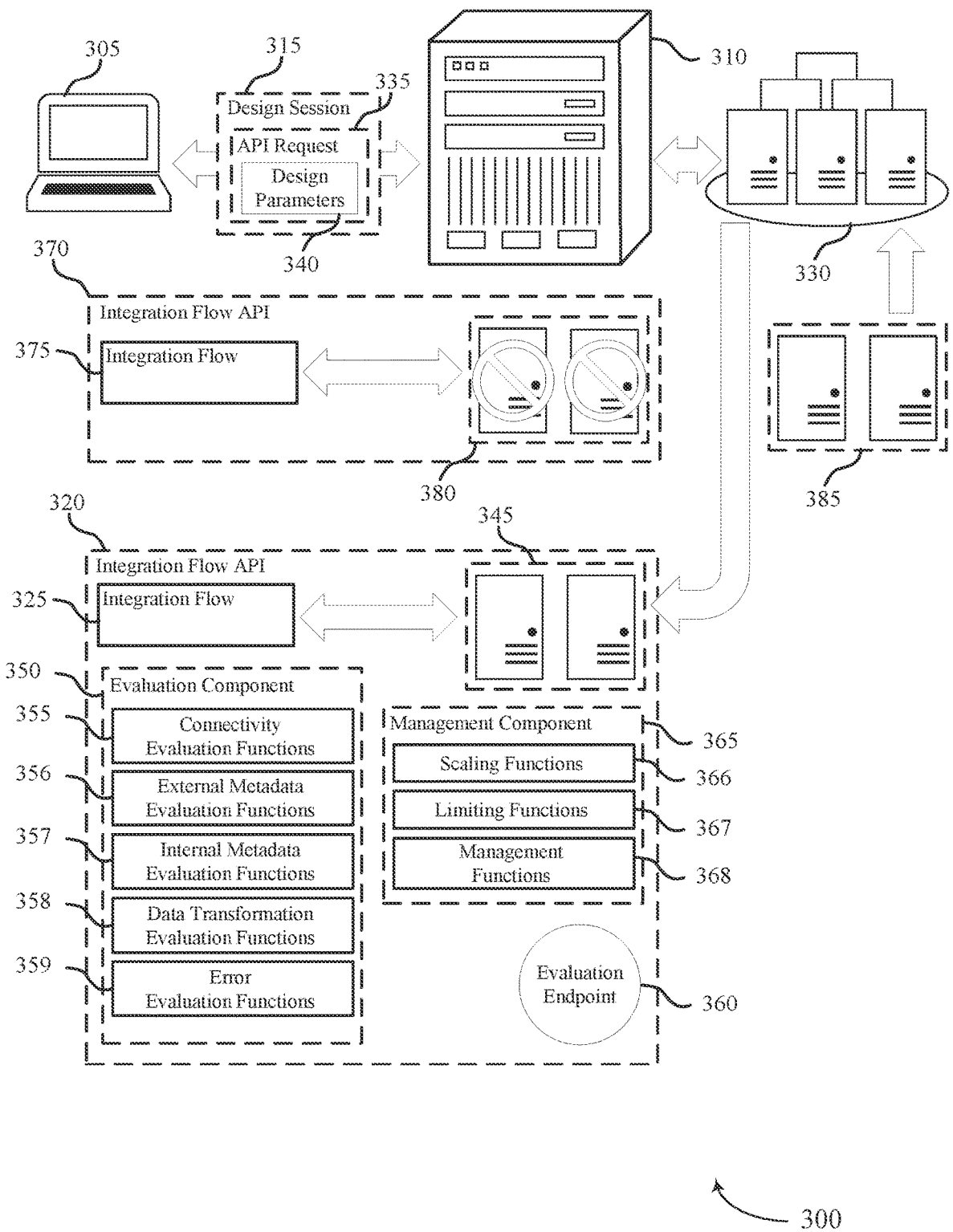
FIG. 3 illustrates an example of an architecture diagram of a system that supports an application programming interface for integration flow design in accordance with aspects of the present disclosure.

FIG. 3 illustrates an example of an architecture diagram of a system 300 that supports application programming interface for integration flow design in accordance with aspects of the present disclosure. The system 300 may include a client 305, which may be an example of client 205 as described with reference to FIG. 2. The client 305 may communicate with the server 310 in order to access the functions or information supported by the server 310. The server 310 may perform various functions or provide information to the client 305, similar to the server 210 described in FIG. 2. Though an exemplary single client 305 is referenced in FIG. 3 and the accompanying discussion for clarity's sake, the server 310 and other elements described herein may also support any number of clients 305.

In some examples of the subject matter discussed herein, the client 305 may establish a design session 315 with the server 310. In some examples, the client 305 may also interface with an integration flow API 320 for creation, modification, evaluation, or other operations associated with a related integration flow 325. The integration flow API 320 may be an example of the integration flow API 225 described in relation to FIG. 2.

In some examples of the subject matter discussed herein, a compute instance pool 330 may be initialized. The compute instance pool 330 may also be referred to as a plurality of compute instances. The compute instance pool 330 may be an example of the plurality of compute instances 230 described in relation to FIG. 2. The compute instance pool 330 may be established even before the design session 315 is established, and the compute instances of the compute instance pool 330 may be initialized so that they may be ready to support the design session 315 once the design session 315 is established. As such, the compute instance pool 330 may be pre-warmed up before a design session 315 is initiated or established. In some examples, a minimum number of compute instances to maintain in the compute instance pool 330 may be determined. In some examples, the number of compute instances to maintain in the compute instance pool 330 may be as high as possible. In this way, an amount of resources may be held in reserve to meet demand from clients wishing to utilize the services of the server 310 or the integration flow API 320. In some examples, the minimum number of compute instances to maintain in the compute instance pool 330 may be determined based on an initialization time of one or more compute instances. In this way, the delay in provisioning compute instances to support the design session 315 and integration flow 325 may be reduced or eliminated. In some examples, if the number of compute instances in the compute instance pool 330 does not meet the determine the minimum number, additional compute instances may be initialized to join the compute instance pool 330 to maintain an established amount of compute instances in the compute instance pool 330 and maintain in reserve an amount of resources.

In some examples of the subject matter discussed herein, the client 305 may send an API request 335 to the server 310 through the integration flow API 320. The API request 335 may contain design parameters 340 related to the creation, modification, evaluation, operation, or other aspects associated with the integration flow 325.

In some examples of the subject matter discussed herein, one or more compute instances may be provisioned from the compute instance pool 330. The provisioned compute instances 345 may be provisioned to support the design session 315 associated with the integration flow 325. The provisioned compute instances 345 may be an example of the provisioned compute instances 235 described in relation to FIG. 2. The provisioned compute instances 345, along with the compute instances of the compute instance pool 330, may include any appropriate platform, such as individual machines, virtual machines, scripts, programs, artificial intelligence, or other platforms capable of performing the data processing, computation, evaluation, or other tasks for supporting the design session 315 and the integration flow 325. In some examples, the provisioned compute instances 345 may be determined or chosen based on one or more characteristics of the compute instance pool 330, the design parameters 340, or both.

In some examples of the subject matter discussed herein, the integration flow API 320 may also include an evaluation component 350 for evaluating a configuration associated with the integration flow 325. In some examples, the evaluation performed may be based on the design parameters 340 received through the API request 335. Many different kinds of evaluation, testing, and analysis may be performed on a configuration associated with the integration flow 325, other elements associated with the integration flow 325, or the integration flow 325 itself.

In some examples of the subject matter discussed herein, the evaluation component 350 may be configured to include connectivity evaluation functions 355. In some examples, such connectivity evaluation functions 355 may evaluate one or more elements of an integration flow configuration. For example, the connectivity evaluation functions 355 may evaluate a connection to an external service, a connection to an internal service, a connection to data storage, or connection to another element of the integration flow 325 to determine whether or not a connection may be established using data provided to the integration flow 325 or to the integration flow configuration.

In some examples of the subject matter discussed herein, the evaluation component 350 may be configured to include external metadata evaluation functions 356. In some examples, such an external metadata evaluation function 356 may retrieve, evaluate, process, or otherwise interact with metadata associated with an external service. This metadata may include dynamic aspects such as custom data types, formatting, organization, or other aspects associated with the external service that may be configured in the integration flow 325 for the integration flow 325 to function properly.

In some examples of the subject matter discussed herein, the evaluation component 350 may be configured to include internal metadata evaluation functions 357. In some examples, such internal metadata evaluation functions 357 may calculate, retrieve, evaluate, process, or otherwise interact with metadata that may flow through the integration flow 325. For example, this metadata could include input/output metadata for one or more elements in the integration flow. The internal metadata evaluation functions 357 may evaluate a portion of such metadata in the integration flow 325 or may evaluate metadata flows throughout the entire integration flow 325, and may evaluate many different kinds of metadata used in the integration flow 325.

In some examples of the subject matter discussed herein, the evaluation component 350 may be configured to include data transformation evaluation functions 358. In some examples, the data transformation evaluation functions 358 may execute data transformation scripts on data associated with the integration flow 325 to determine whether such a data transformation would be properly performed upon running the complete integration flow 325. In addition, the data transformation evaluation functions 358 may also perform the data transformation while running the integration flow 325. In some examples, the data transformations performed by the data transformation evaluation functions 358 may be based on a context defined by dependencies used in the integration flow 325 or in other services that may interface with the integration flow 325 in some way.

In some examples of the subject matter discussed herein, the evaluation component 350 may be configured to include error evaluation functions 359. In some examples, the error evaluation functions 359 may evaluate an integration flow configuration or the integration flow 325 itself for errors that may occur while running the integration flow 325. For example, the error evaluation functions 359 may determine that data to be sent to an external service is not formatted correctly, and that the integration flow 325 did not or would not function properly. The error evaluation functions 359 may be configured to detect any number of errors in the integration flow 325, a configuration associated with the integration flow 325, or other aspects of the subject matter discussed herein. In some examples, the error identification, evaluation, or analysis performed by the error evaluation functions 359 may also include debugging, such as asynchronous debugging, synchronous debugging, other debugging approaches, or any combination thereof.

In some examples, asynchronous debugging may include partial or complete execution, evaluation, or analysis of applications, portions of the integration flow 325, or other elements of the subject matter discussed herein. The asynchronous debugging may provide access to log events and messages, and may also enable consumption of associated endpoints. In some examples, synchronous debugging may include debugging that extends the asynchronous debugging approaches that may include access to internal statuses not available in asynchronous debugging. Synchronous debugging may also include features such as break points, threads statuses, context content, or other debugging information.

The error evaluation functions 359 may also report identified errors to the client 305, so that the client 305 may make changes to the integration flow 325, an integration flow configure associated with the integration flow 325, or other aspect of the subject matter discussed herein. This reporting may be performed in any appropriate way that conveys the error information to the client.

In some examples of the subject matter discussed herein, the integration flow API 320 may be configured to include an evaluation endpoint 360. The evaluation endpoint 360 may provide easy access to the client 305 or other entity to interface with the integration flow 325 itself. For example, a client 305 may be able to access the evaluation endpoint 360 to submit data to the integration flow 325 and run portions or the entirety of the integration flow 325 to evaluate performance of the integration flow. In some examples, exposing the evaluation endpoint 360 may include creating a domain that can be accessed from outside the cluster to exercise the integration flow 325.

In some examples of the subject matter discussed herein, the integration flow API 320 may include a management component 365. The management component 365 may be configured to manage various aspects of the integration flow 325, the integration flow API 320 itself, the compute instance pool 330, provisioned compute instances 345, or other aspects of the subject matter discussed herein.

In some examples of the subject matter discussed herein, the management component 365 may be configured with scaling functions 366 that may scale the provisioned compute instances 345 based on the earlier provisioning done. For example, it may be determined that additional compute instances should be assigned to support the design session 315 and the integration flow 325. The scaling functions 366 may then scale the number of provisioned compute instances 345 to meet the demand of supporting the design session 315 and integration flow 325. In other examples, it may be determined that there are excess provisioned compute instances 345 assigned to support the design session 315 and integration flow 325, and the scaling functions 366 may then scale down the number of provisioned compute instances 345. The scaling functions 366 offer increased capabilities to meet demand at times, while maintaining an economic use of resources at other times.

In addition, in situations where many compute instances are restarted within a time frame, or when scaling operations are made, the impact on the pool of available compute instances to be provisioned may be reduced through an auto-scaling strategy that may be included in the scaling functions 366. Such a strategy may more aggressively scale the compute instance pool 330, provisioned compute instances 345, or other available resources to reduce or eliminate the impact on available resources caused by compute instance restarts or other demands placed on available resources.

In some examples of the subject matter discussed herein, the management component 365 may be configured with limiting functions 367. The limiting functions 367 may, at times, limit the number of provisioned compute instances 345 assigned to support the design session 315 and integration flow 325. Such a limitation may be imposed even if the client's 305 operations in the design session 315 might otherwise warrant an increase in the provisioned compute instances 345. In some examples, the limiting functions 367 may limit the number of provisioned compute instances 345 based on a number of compute instances in the compute instance pool 330. In this way, the limiting functions 367 may take into account the amount of resources available in the compute instance pool 330 to be dedicated to other design sessions and integration flows, thereby balancing resources across the demands of various clients and design sessions.

In some examples of the subject matter discussed herein, the management component 365 may be configured with other management functions 368. Such management functions 368 may manage aspects of the integration flow API 320, the design session 315, or other aspects of the subject matter currently discussed herein. For example, the management functions 368 may manage the provisioning of the provisioned compute instances 345. The management functions 368 may, in some examples, manage the initialization and maintenance of the compute instance pool 330. In some examples, the management functions 368 may perform some or all of the management associated with operation or implementation of the subject matter described herein.

Element 370 depicts an interface to the integration flow API 320 belonging to another client. In this interface, the design session for the corresponding integration flow 375 has already been completed, and the resources assigned for the design session are no longer needed. The compute instances provisioned for this design session have been terminated, and designated as terminated compute instances 380. In response to the terminated compute instances 380 being marked for termination (or in response to actual termination of the terminated compute instances 380), the integration flow API 320 may initialize replacement compute instances 385 to replace the terminated compute instances 380. The integration flow API 320 may also associate the replacement compute instances 385 with the compute instance pool 330. In this way, the terminated compute instances 380 may be replaced so that additional compute instances in the compute instance pool 330 may be initialized even before they are requested by a client establishing a design session for an integration flow.

Figure 4:
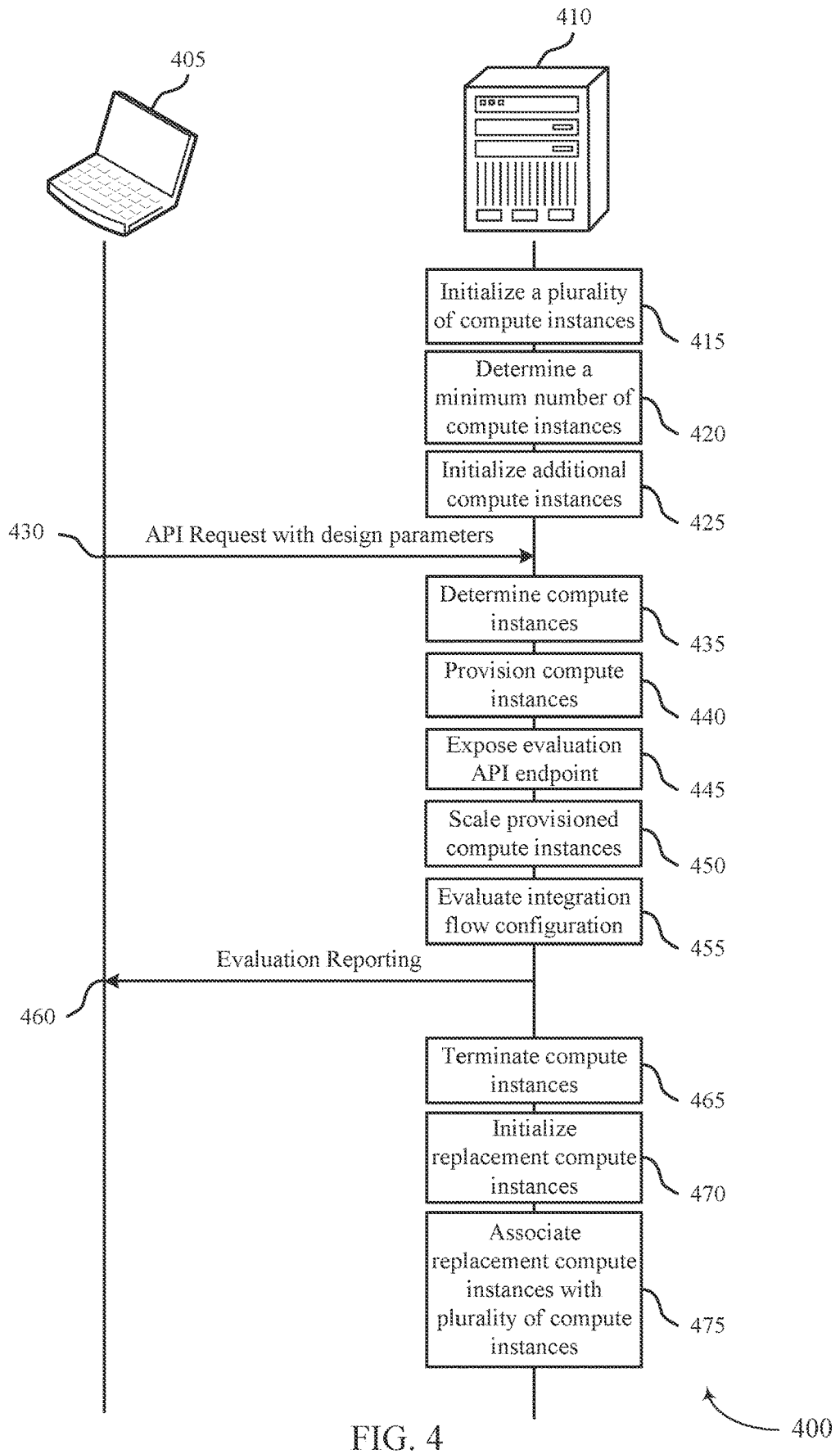
FIG. 4 illustrates an example of a process flow that supports an application programming interface for integration flow design in accordance with aspects of the present disclosure.

FIG. 4 illustrates an example of a process flow 400 that supports application programming interface for integration flow design in accordance with aspects of the present disclosure. Many of these elements described here may be optional. The process flow 400 may include a client 405. The client 405 may communicate with a server 410 that includes an integration flow API. The client 405, server 410, and integration flow API may be examples of corresponding clients, servers, and integration flow APIs as described with reference to FIGS. 1-3.

In some examples, the server 410 may coordinate the various resources used in a serverless design. For example, a plurality of compute instances as described in relation to FIGS. 1-3 may not be housed on a single server. Rather, the techniques described herein may utilize a serverless design in which the compute instances or other resources may not be located on a single server or machine, and are distributed across a number of machines. Thus, the techniques described herein, including those relating to provisioning of compute instances, may be performed on a serverless design or architecture. By utilizing a serverless design, the compute instances and other resources are not limited to a certain set of servers, machines, or environments. Dynamic assignment, scaling, provisioning, deprovisioning, processing, and other data processing tasks may be performed more efficiently by virtue of such a serverless design, among other reasons.

In some examples, including some examples of serverless designs or architectures, the server 410, as well as the servers 210 and 310 described in relation to FIG. 3, may coordinate some or all of the functions described herein. For example, the server 410 may coordinate provisioning of compute instances, even though the compute instances may not be operating on the server 410. For example, a cluster (which may be an example of server 410, server 310, or server 210) may provide or coordinate services for multiple tenants wishing to run a design session.

In some examples, the servers 210, 310, and 410 may be dedicated servers, and in other instances they may be virtual machines, local machines, or other data processing points that perform the functions discussed herein, among others. In addition, the server 410 may be an example of a resource available on the serverless design or architecture, and may not be limited to operating on a single, physical machine.

At 415, a plurality of compute instances configured to support a design session for an integration flow may be initialized. These compute instances may be held in a compute instance pool or plurality of compute instances as described with reference to FIGS. 1-3.

At 420, in some examples, a minimum number of compute instances to maintain in the plurality of compute instances may be determined based at least in part on an initialization time of one or more additional compute instances. As described with reference to FIGS. 1-3, if compute instances are taking a long time to initialize, more compute instances may be held in reserve. If compute instances are initializing more rapidly, fewer compute instances may be held in reserve.

At 425, additional compute instances may be initialized to join the plurality of compute instances based at least in part on the determination of the minimum number compute instances to maintain the plurality of compute instances. In some examples, the compute instances may be initialized if a condition is met. As described with reference to FIGS. 1-3, such a condition may include a condition that the current number of compute instances in the compute instance pool is below the determined minimum number of compute instances.

At 430, the server 410 may receive, from the client 405, an API request at an API, the API request comprising one or more design parameters associated with the integration flow.

As described with reference to FIGS. 1-3, the API request may include design parameters that may define configurations, options, or other parameters related to the design session and the integration flow. In some examples, the API may also receive a link to an application as a parameter. Such an application may be deployed as tooling, a standard application, or a combination thereof.

At 435, the provisioned compute instances may be determined based at least in part on one or more characteristics of the plurality of compute instances, one or more design parameters, or both. As described with reference to FIGS. 1-3, this may include determining which compute instances of the compute instance pool may be provisioned to support a particular design session and integration flow. In some examples, the characteristics may include a particular aptitude, suitability, or optimization for different tasks. For example, some compute instances and may be optimized for computational efficiency, whereas other compute instances may be optimized to reduce memory usage. Additional characteristics may also be considered. In addition, the design parameters may prescribe limitations or preferences that may dictate the choice of particular compute instances.

At 440, one or more compute instances may be provisioned, for the design session and from the plurality of initialized compute instances, based at least in part on the one or more design parameters. As described with reference to FIGS. 1-3, the particular number of compute instances to be provisioned may vary based on a variety of factors, including the needs of the design session, the integration flow, or the client, as well as an amount of resources available in the plurality of compute instances, or other factors.

At 445, an API endpoint may be exposed for testing the integration flow. As described with reference to FIGS. 1-3, such an endpoint allows a client 405 to test the integration flow. For example, the user may submit data to the endpoint so that the integration flown a process the data according to an integration flow configuration defined by the client 405 during the design session associated with the integration flow.

At 450, an amount of compute instances provisioned for the design session may be scaled based at least in part on the provisioning of the provisioned compute instances. As described with reference to FIGS. 1-3, the scaling may be performed based on a variety of factors including demand for additional processing for the design session and the integration flow and under-utilization of resources assigned to support the design session and integration flow.

At 455, the integration flow configuration associated with the integration flow may be evaluated, evaluating based at least in part on the one or more design parameters. As described with reference to FIGS. 1-3, such a evaluation may include a variety of evaluations, including connectivity evaluation, external metadata evaluation, internal metadata evaluation, data transformation evaluation, and error evaluation.

At 460, results, information, analyses or other data of an evaluation performed may be sent to the client 405. Such information allows the client 405 to make additional decisions in the design session to improve the design of the integration flow and associated configurations.

At 465, the one or more compute instances are terminated upon completion of the design session. As described with reference to FIGS. 1-3, these two instances may be terminated to maintain security between clients 405 and their respective design sessions and integration flows, among other reasons.

At 470, one or more replacement compute instances are initialized to replace the one or more terminated compute instances. As described with reference to FIGS. 1-3, in may be desirable to maintain an amount of compute instances or other resources in reserve to handle additional demand that may come from additional clients and their respective design sessions. In addition, by replacing compute instances that are terminated even before a client establishes a design session, delays in compute instance provisioning may be reduced or eliminated.

As 475, the one or more replacement compute instances are associated with a plurality of compute instances. As described with reference to FIGS. 1-3, these replacement compute instances, after being associated with a plurality of compute instances, are then available to be used to support various design sessions and integration flows as needed while solving the technical problems described with compute instance provisioning, CPU consumption, under-utilization of resources, delays in compute instance termination, memory leaks and instability.

Figure 5:
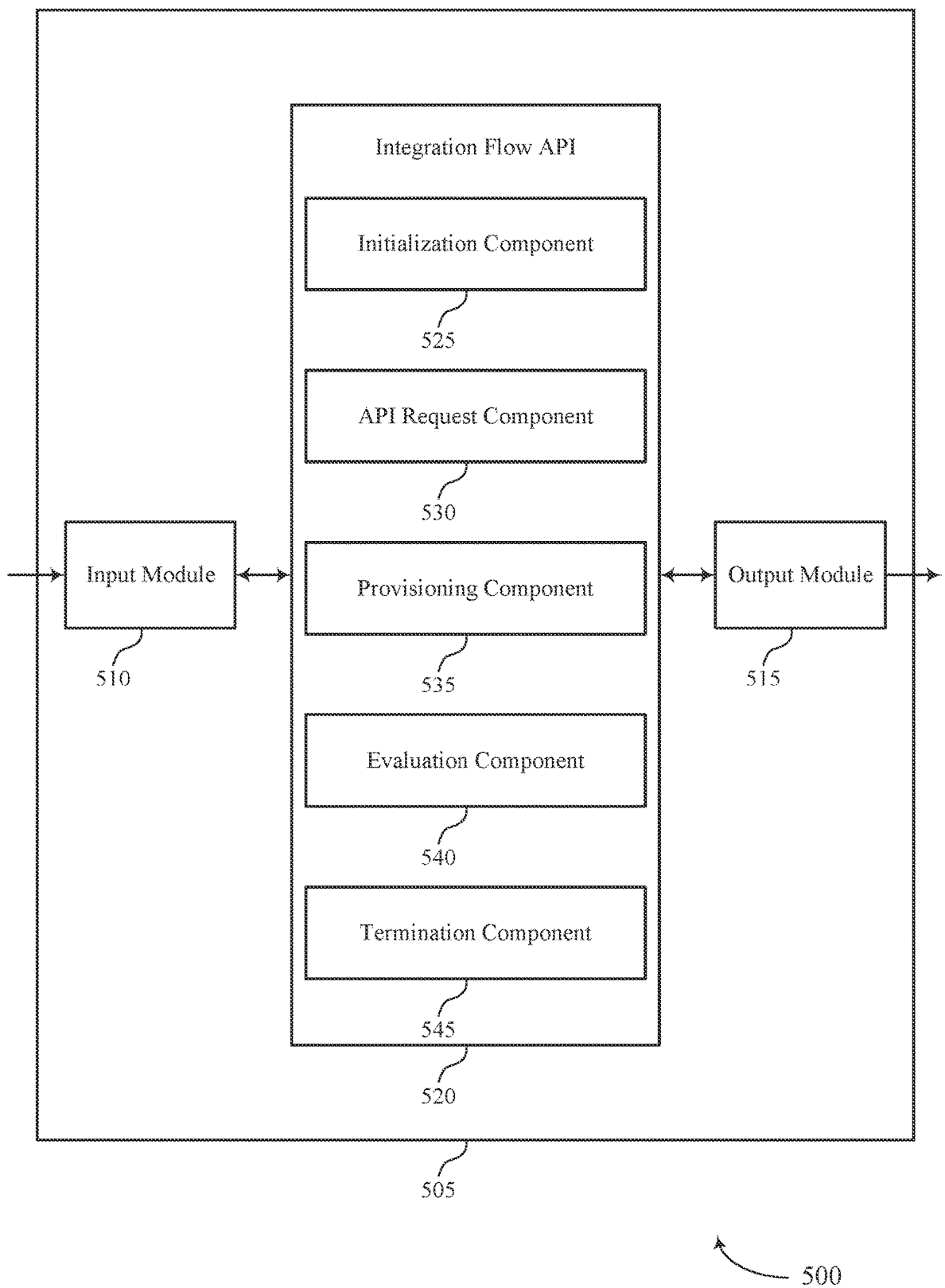
FIG. 5 shows a block diagram of an apparatus that supports an application programming interface for integration flow design in accordance with aspects of the present disclosure.

FIG. 5 shows a block diagram 500 of a device 505 that supports application programming interface for integration flow design in accordance with aspects of the present disclosure. The device 505 may include an input module 510, an output module 515, and an integration flow API 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the integration flow API 520 to support application programming interface for integration flow design. In some cases, the input module 510 may be a component of an I/O controller 710 as described with reference to FIG. 7.

The output module 515 may manage output signals for the device 505. For example, the output module 515 may receive signals from other components of the device 505, such as the integration flow API 520, and may transmit these signals to other components or devices. In some specific examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the integration flow API 520 may include an initialization component 525, an API request component 530, a provisioning component 535, an evaluation component 540, a termination component 545, or any combination thereof. In some examples, the integration flow API 520, or various components thereof, may be configured to perform various operations (e.g., receiving, monitoring, transmitting) using or otherwise in cooperation with the input module 510, the output module 515, or both. For example, the integration flow API 520 may receive information from the input module 510, send information to the output module 515, or be integrated in combination with the input module 510, the output module 515, or both to receive information, transmit information, or perform various other operations as described herein.

The integration flow API 520 may support data processing at an application server in accordance with examples as disclosed herein. The initialization component 525 may be configured as or otherwise support a means for initializing a plurality of compute instances configured to support a design session for an integration flow. The API request component 530 may be configured as or otherwise support a means for receiving, from a client, an application programming interface (API) request at an API, the API request comprising one or more design parameters associated with the integration flow. The provisioning component 535 may be configured as or otherwise support a means for provisioning, for the design session and from the plurality of initialized compute instances, one or more compute instances based at least in part on the one or more design parameters. The evaluation component 540 may be configured as or otherwise support a means for evaluating an integration flow configuration associated with the integration flow, the evaluating based at least in part on the one or more design parameters. The termination component 545 may be configured as or otherwise support a means for terminating the one or more compute instances upon completion of the design session.

Figure 6:
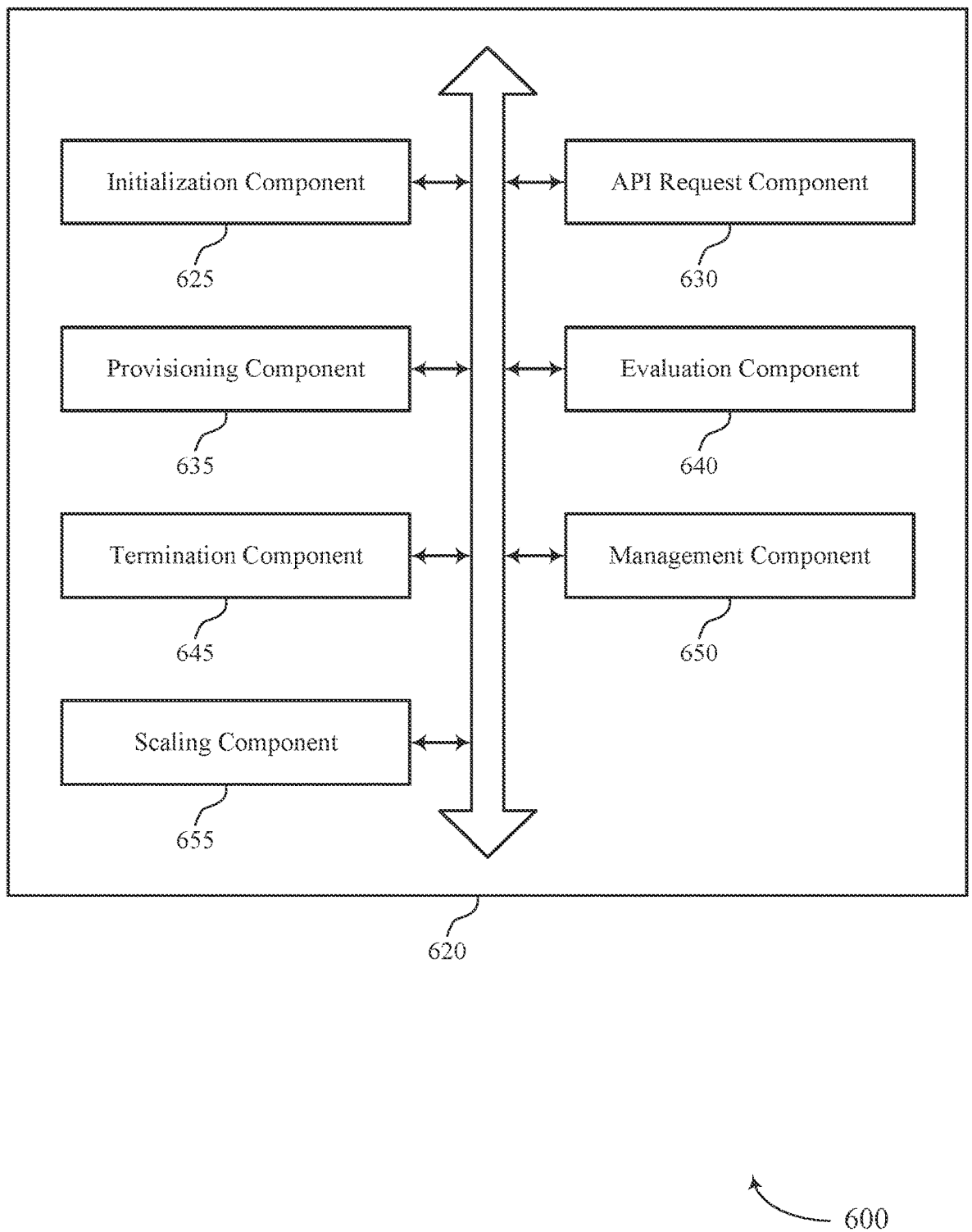
FIG. 6 shows a block diagram of an integration flow API that supports an application programming interface for integration flow design in accordance with aspects of the present disclosure.

FIG. 6 shows a block diagram 600 of an integration flow API 620 that supports application programming interface for integration flow design in accordance with aspects of the present disclosure. The integration flow API 620 may be an example of aspects of an integration flow API or an integration flow API 520, or both, as described herein. The integration flow API 620, or various components thereof, may be an example of means for performing various aspects of application programming interface for integration flow design as described herein. For example, the integration flow API 620 may include an initialization component 625, an API request component 630, a provisioning component 635, an evaluation component 640, a termination component 645, a management component 650, a scaling component 655, or any combination thereof. Each of these components may communicate, directly or indirectly, with one another (e.g., via one or more buses).

The integration flow API 620 may support data processing at an application server in accordance with examples as disclosed herein. The initialization component 625 may be configured as or otherwise support a means for initializing a plurality of compute instances configured to support a design session for an integration flow. The API request component 630 may be configured as or otherwise support a means for receiving, from a client, an application programming interface (API) request at an API, the API request comprising one or more design parameters associated with the integration flow. The provisioning component 635 may be configured as or otherwise support a means for provisioning, for the design session and from the plurality of initialized compute instances, one or more compute instances based at least in part on the one or more design parameters. The evaluation component 640 may be configured as or otherwise support a means for evaluating an integration flow configuration associated with the integration flow, the evaluating based at least in part on the one or more design parameters. The termination component 645 may be configured as or otherwise support a means for terminating the one or more compute instances upon completion of the design session.

In some examples, the initialization component 625 may be configured as or otherwise support a means for initializing one or more replacement compute instances to replace the one or more terminated compute instances. In some examples, the management component 650 may be configured as or otherwise support a means for associating the one or more replacement compute instances with the plurality of compute instances.

In some examples, the management component 650 may be configured as or otherwise support a means for determining a minimum number of compute instances to maintain in the plurality of compute instances based at least in part on an initialization time of one or more additional compute instances.

In some examples, the initialization component 625 may be configured as or otherwise support a means for initializing one or more additional compute instances to join the plurality of compute instances based at least in part on the determining.

In some examples, the scaling component 655 may be configured as or otherwise support a means for scaling an amount of compute instances provisioned for the design session based at least in part on the provisioning.

In some examples, to support provisioning, for the design session and from the plurality of initialized compute instances, one or more compute instances, the provisioning component 635 may be configured as or otherwise support a means for limiting the number of compute instances provisioned for the design session based at least in part on a number of compute instances in the plurality of compute instances.

In some examples, the provisioning component 635 may be configured as or otherwise support a means for determining the one or more provisioned compute instances based at least in part on one or more characteristics of the plurality of compute instances, the one or more design parameters, or both.

In some examples, to support evaluating the integration flow configuration associated with the integration flow, the evaluation component 640 may be configured as or otherwise support a means for testing connectivity in the integration flow to determine a connection status for the integration flow based at least in part on the one or more design parameters.

In some examples, to support evaluating the integration flow configuration associated with the integration flow, the evaluation component 640 may be configured as or otherwise support a means for retrieving metadata associated with an external service with which the integration flow interfaces based at least in part on the one or more design parameters.

In some examples, to support evaluating the integration flow configuration associated with the integration flow, the evaluation component 640 may be configured as or otherwise support a means for evaluating a data transformation within the integration flow based at least in part on the one or more design parameters.

In some examples, to support evaluating the integration flow configuration associated with the integration flow, the evaluation component 640 may be configured as or otherwise support a means for determining integration flow metadata in the integration flow based at least in part on the one or more design parameters.

In some examples, to support evaluating the integration flow configuration associated with the integration flow, the evaluation component 640 may be configured as or otherwise support a means for identifying errors in the integration flow. In some examples, to support evaluating the integration flow configuration associated with the integration flow, the evaluation component 640 may be configured as or otherwise support a means for reporting the errors to the client.

In some examples, to support identifying errors in the integration flow, the evaluation component 640 may be configured as or otherwise support a means for asynchronous debugging, synchronous debugging, or a combination thereof.

In some examples, to support evaluating the integration flow configuration associated with the integration flow, the evaluation component 640 may be configured as or otherwise support a means for exposing an API endpoint for testing the integration flow.

Figure 7:
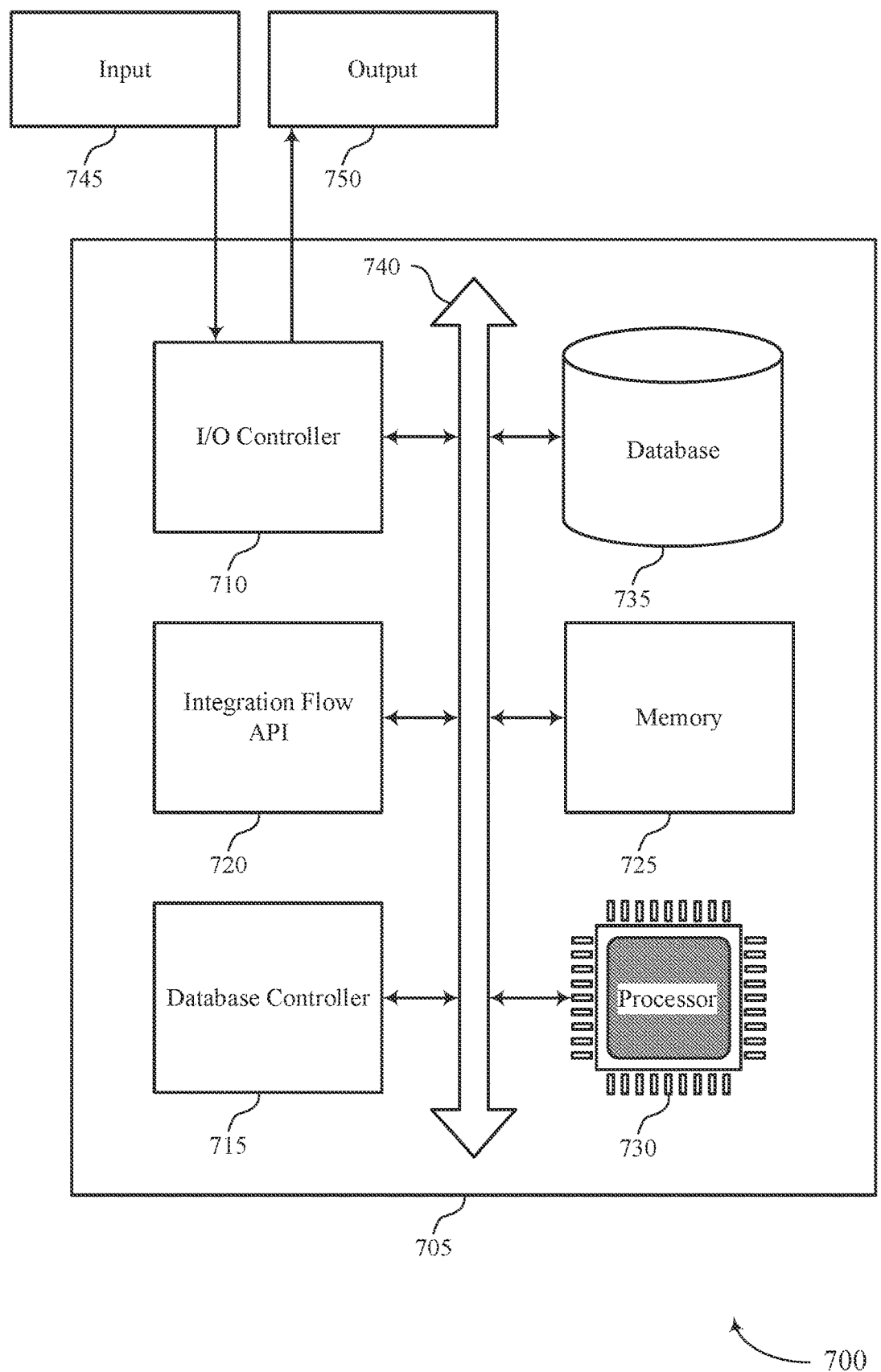
FIG. 7 shows a diagram of a system including a device that supports an application programming interface for integration flow design in accordance with aspects of the present disclosure.

FIG. 7 shows a diagram of a system 700 including a device 705 that supports application programming interface for integration flow design in accordance with aspects of the present disclosure. The device 705 may be an example of or include the components of a device 505 as described herein. The device 705 may include components for bi-directional data communications including components for transmitting and receiving communications, such as an integration flow API 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor. In some cases, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and ROM. The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting application programming interface for integration flow design).

The integration flow API 720 may support data processing at an application server in accordance with examples as disclosed herein. For example, the integration flow API 720 may be configured as or otherwise support a means for initializing a plurality of compute instances configured to support a design session for an integration flow. The integration flow API 720 may be configured as or otherwise support a means for receiving, from a client, an application programming interface (API) request at an API, the API request comprising one or more design parameters associated with the integration flow. The integration flow API 720 may be configured as or otherwise support a means for provisioning, for the design session and from the plurality of initialized compute instances, one or more compute instances based at least in part on the one or more design parameters. The integration flow API 720 may be configured as or otherwise support a means for evaluating an integration flow configuration associated with the integration flow, the evaluating based at least in part on the one or more design parameters. The integration flow API 720 may be configured as or otherwise support a means for terminating the one or more compute instances upon completion of the design session.

Figure 8:
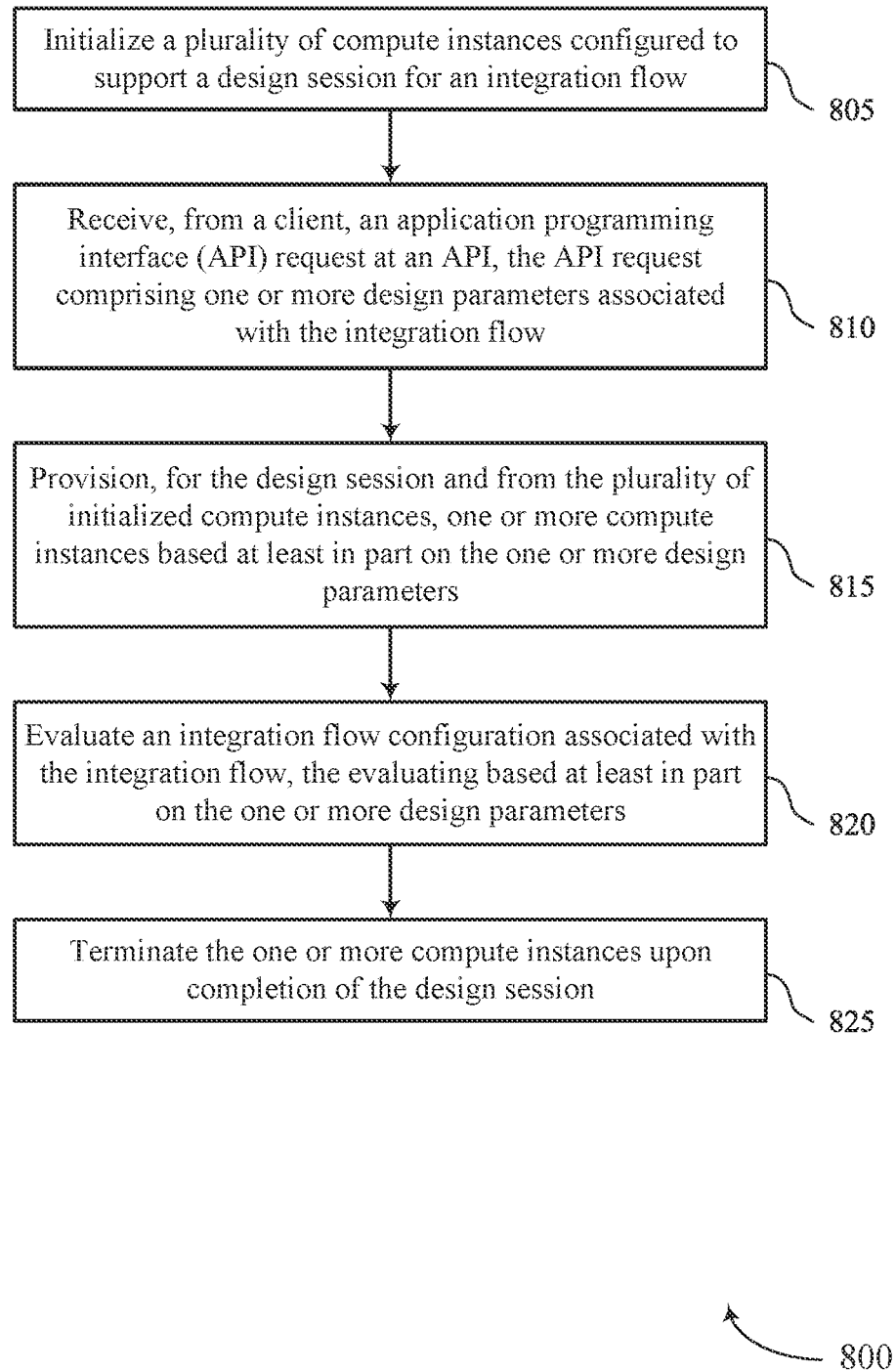
FIGS. 8 through 12 show flowcharts illustrating methods that support an application programming interface for integration flow design in accordance with aspects of the present disclosure.

By including or configuring the integration flow API 720 in accordance with examples as described herein, the device 705 may support improved performance in connection with integration flows and design sessions, such as reduced or eliminated delays in compute instance provisioning, reduced or eliminated memory leaks and instability, more efficient CPU utilization, reduced or eliminated waste of resources (e.g., delays in compute instance termination), and user interface problems (e.g., a user's API quota may be met or exceeded by wasted resources). And FIG. 8 shows a flowchart illustrating a method 800 that supports application programming interface for integration flow design in accordance with aspects of the present disclosure. The operations of the method 800 may be implemented by a database server, an application server, or its components as described herein. For example, the operations of the method 800 may be performed by a database server, an application server, as described with reference to FIGS. 1 through 7. In some examples, a database server, an application server, may execute a set of instructions to control the functional elements of the database server, an application server, to perform the described functions. Additionally or alternatively, the database server, an application server, may perform aspects of the described functions using special-purpose hardware.

At 805, the method may include initializing a plurality of compute instances configured to support a design session for an integration flow. The operations of 805 may be performed in accordance with examples as disclosed herein. In some examples, aspects of the operations of 805 may be performed by an initialization component 625 as described with reference to FIG. 6.

At 810, the method may include receiving, from a client, an API request at an API, the API request comprising one or more design parameters associated with the integration flow. The operations of 810 may be performed in accordance with examples as disclosed herein. In some examples, aspects of the operations of 810 may be performed by an API request component 630 as described with reference to FIG. 6.

At 815, the method may include provisioning, for the design session and from the plurality of initialized compute instances, one or more compute instances based at least in part on the one or more design parameters. The operations of 815 may be performed in accordance with examples as disclosed herein. In some examples, aspects of the operations of 815 may be performed by a provisioning component 635 as described with reference to FIG. 6.

At 820, the method may include evaluating an integration flow configuration associated with the integration flow, the evaluating based at least in part on the one or more design parameters. The operations of 820 may be performed in accordance with examples as disclosed herein. In some examples, aspects of the operations of 820 may be performed by an evaluation component 640 as described with reference to FIG. 6.

At 825, the method may include terminating the one or more compute instances upon completion of the design session. The operations of 825 may be performed in accordance with examples as disclosed herein. In some examples, aspects of the operations of 825 may be performed by a termination component 645 as described with reference to FIG. 6.

Figure 9:
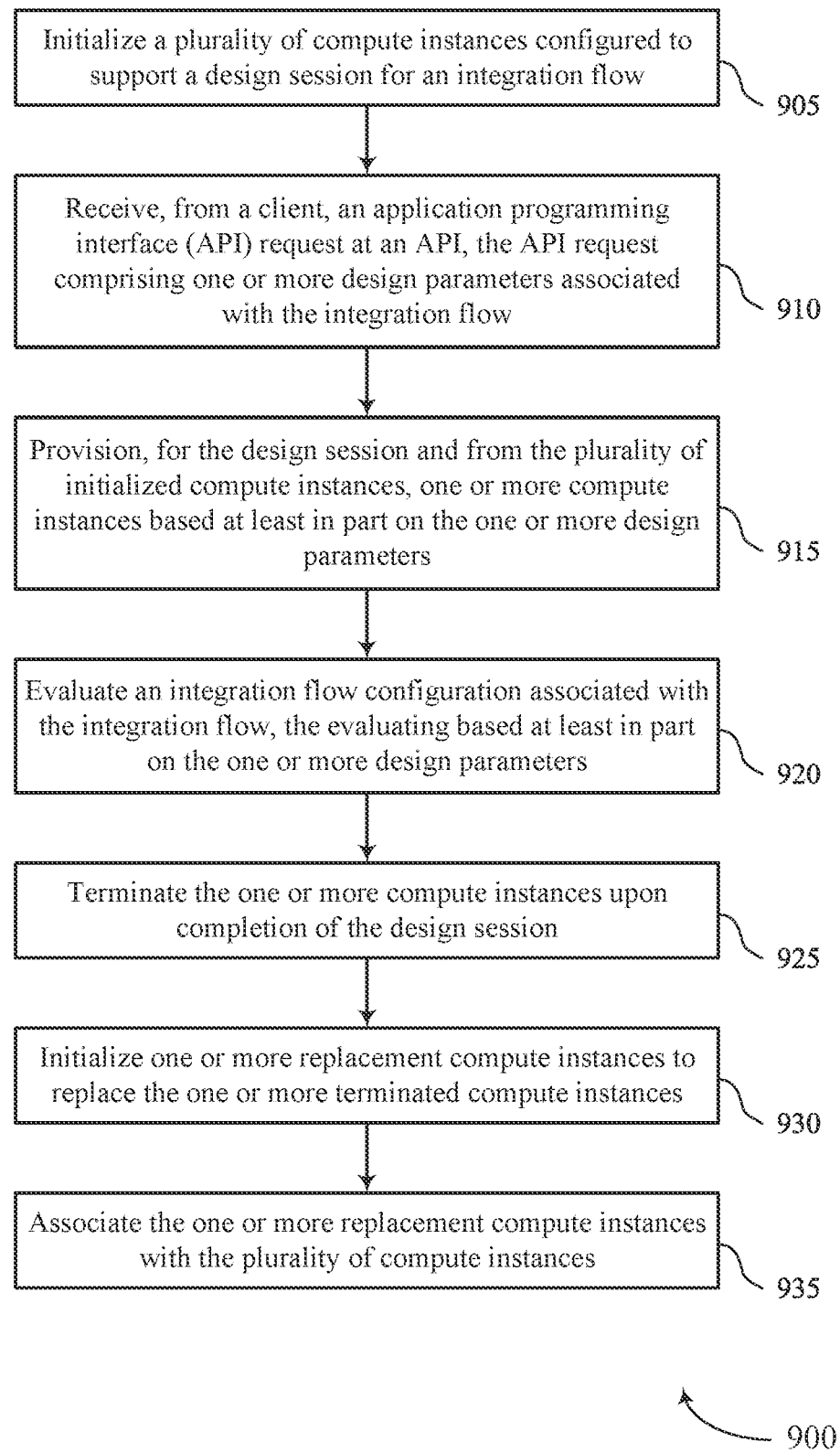

FIG. 9 shows a flowchart illustrating a method 900 that supports application programming interface for integration flow design in accordance with aspects of the present disclosure. The operations of the method 900 may be implemented by a database server, an application server, or its components as described herein. For example, the operations of the method 900 may be performed by a database server, an application server, as described with reference to FIGS. 1 through 7. In some examples, a database server, an application server, may execute a set of instructions to control the functional elements of the database server, an application server, to perform the described functions. Additionally or alternatively, the database server, an application server, may perform aspects of the described functions using special-purpose hardware.

At 905, the method may include initializing a plurality of compute instances configured to support a design session for an integration flow. The operations of 905 may be performed in accordance with examples as disclosed herein. In some examples, aspects of the operations of 905 may be performed by an initialization component 625 as described with reference to FIG. 6.

At 910, the method may include receiving, from a client, an application programming interface (API) request at an API, the API request comprising one or more design parameters associated with the integration flow. The operations of 910 may be performed in accordance with examples as disclosed herein. In some examples, aspects of the operations of 910 may be performed by an API request component 630 as described with reference to FIG. 6.

At 915, the method may include provisioning, for the design session and from the plurality of initialized compute instances, one or more compute instances based at least in part on the one or more design parameters. The operations of 915 may be performed in accordance with examples as disclosed herein. In some examples, aspects of the operations of 915 may be performed by a provisioning component 635 as described with reference to FIG. 6.

At 920, the method may include evaluating an integration flow configuration associated with the integration flow, the evaluating based at least in part on the one or more design parameters. The operations of 920 may be performed in accordance with examples as disclosed herein. In some examples, aspects of the operations of 920 may be performed by an evaluation component 640 as described with reference to FIG. 6.

At 925, the method may include terminating the one or more compute instances upon completion of the design session. The operations of 925 may be performed in accordance with examples as disclosed herein. In some examples, aspects of the operations of 925 may be performed by a termination component 645 as described with reference to FIG. 6.

At 930, the method may include initializing one or more replacement compute instances to replace the one or more terminated compute instances. The operations of 930 may be performed in accordance with examples as disclosed herein. In some examples, aspects of the operations of 930 may be performed by an initialization component 625 as described with reference to FIG. 6.

At 935, the method may include associating the one or more replacement compute instances with the plurality of compute instances. The operations of 935 may be performed in accordance with examples as disclosed herein. In some examples, aspects of the operations of 935 may be performed by a management component 650 as described with reference to FIG. 6.

Figure 10:
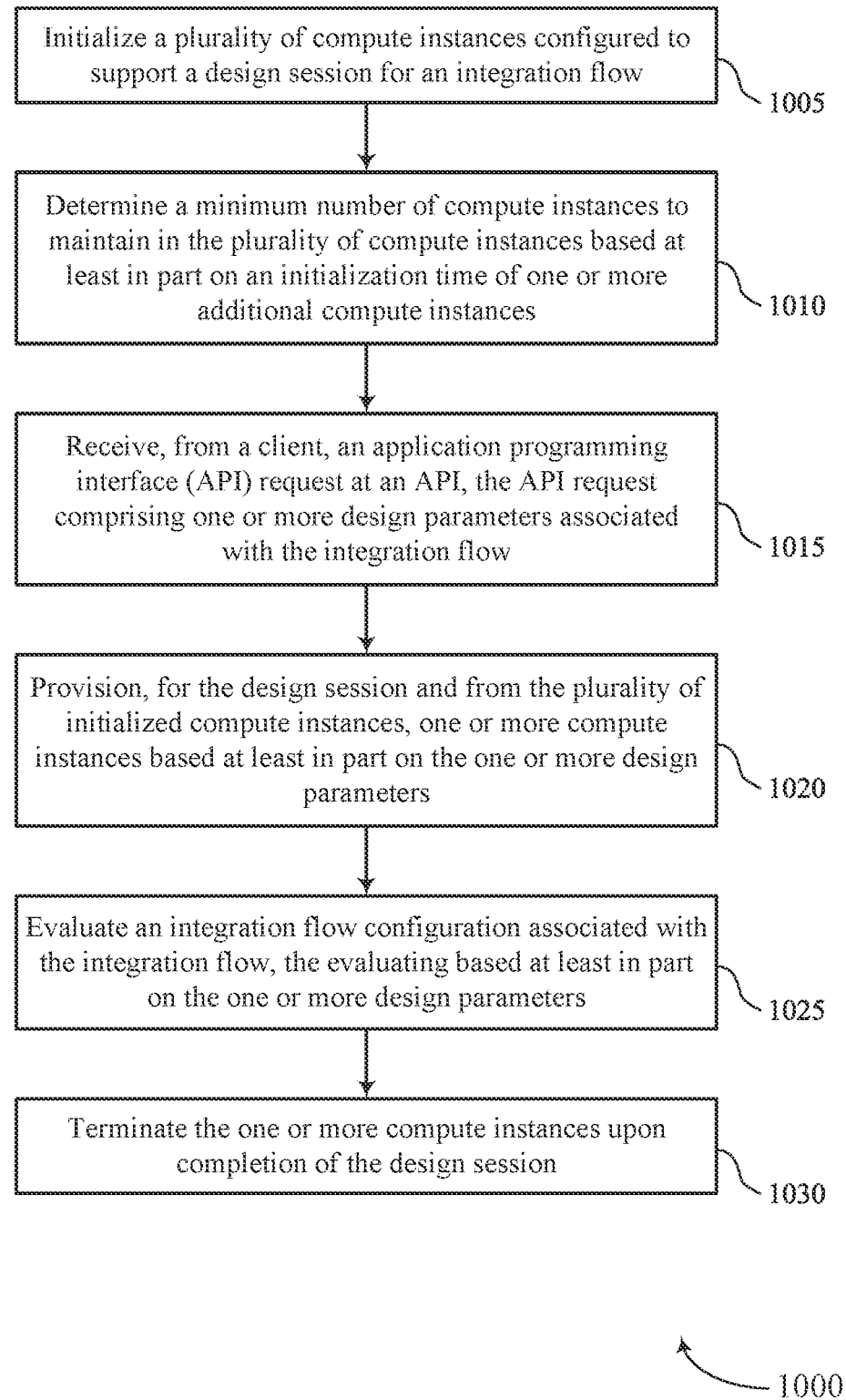

FIG. 10 shows a flowchart illustrating a method 1000 that supports application programming interface for integration flow design in accordance with aspects of the present disclosure. The operations of the method 1000 may be implemented by a database server, an application server, or its components as described herein. For example, the operations of the method 1000 may be performed by a database server, an application server, as described with reference to FIGS. 1 through 7. In some examples, a database server, an application server, may execute a set of instructions to control the functional elements of the database server, an application server, to perform the described functions. Additionally or alternatively, the database server, an application server, may perform aspects of the described functions using special-purpose hardware.

At 1005, the method may include initializing a plurality of compute instances configured to support a design session for an integration flow. The operations of 1005 may be performed in accordance with examples as disclosed herein. In some examples, aspects of the operations of 1005 may be performed by an initialization component 625 as described with reference to FIG. 6.

At 1010, the method may include determining a minimum number of compute instances to maintain in the plurality of compute instances based at least in part on an initialization time of one or more additional compute instances. The operations of 1010 may be performed in accordance with examples as disclosed herein. In some examples, aspects of the operations of 1010 may be performed by a management component 650 as described with reference to FIG. 6.

At 1015, the method may include receiving, from a client, an application programming interface (API) request at an API, the API request comprising one or more design parameters associated with the integration flow. The operations of 1015 may be performed in accordance with examples as disclosed herein. In some examples, aspects of the operations of 1015 may be performed by an API request component 630 as described with reference to FIG. 6.

At 1020, the method may include provisioning, for the design session and from the plurality of initialized compute instances, one or more compute instances based at least in part on the one or more design parameters. The operations of 1020 may be performed in accordance with examples as disclosed herein. In some examples, aspects of the operations of 1020 may be performed by a provisioning component 635 as described with reference to FIG. 6.

At 1025, the method may include evaluating an integration flow configuration associated with the integration flow, the evaluating based at least in part on the one or more design parameters. The operations of 1025 may be performed in accordance with examples as disclosed herein. In some examples, aspects of the operations of 1025 may be performed by an evaluation component 640 as described with reference to FIG. 6.

At 1030, the method may include terminating the one or more compute instances upon completion of the design session. The operations of 1030 may be performed in accordance with examples as disclosed herein. In some examples, aspects of the operations of 1030 may be performed by a termination component 645 as described with reference to FIG. 6.

Figure 11:
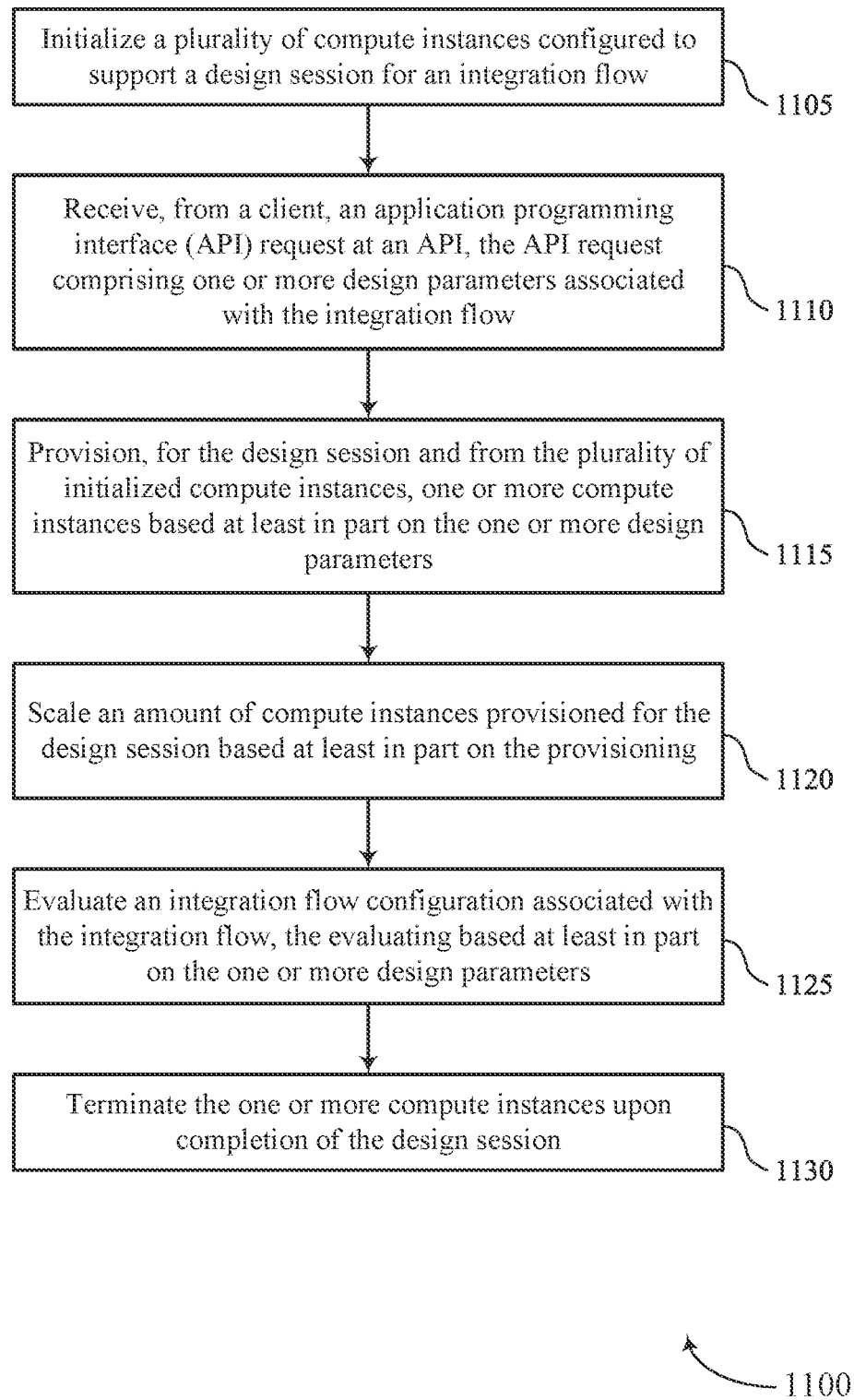

FIG. 11 shows a flowchart illustrating a method 1100 that supports application programming interface for integration flow design in accordance with aspects of the present disclosure. The operations of the method 1100 may be implemented by a database server, an application server, or its components as described herein. For example, the operations of the method 1100 may be performed by a database server, an application server, as described with reference to FIGS. 1 through 7. In some examples, a database server, an application server, may execute a set of instructions to control the functional elements of the database server, an application server, to perform the described functions. Additionally or alternatively, the database server, an application server, may perform aspects of the described functions using special-purpose hardware.

At 1105, the method may include initializing a plurality of compute instances configured to support a design session for an integration flow. The operations of 1105 may be performed in accordance with examples as disclosed herein. In some examples, aspects of the operations of 1105 may be performed by an initialization component 625 as described with reference to FIG. 6.

At 1110, the method may include receiving, from a client, an application programming interface (API) request at an API, the API request comprising one or more design parameters associated with the integration flow. The operations of 1110 may be performed in accordance with examples as disclosed herein. In some examples, aspects of the operations of 1110 may be performed by an API request component 630 as described with reference to FIG. 6.

At 1115, the method may include provisioning, for the design session and from the plurality of initialized compute instances, one or more compute instances based at least in part on the one or more design parameters. The operations of 1115 may be performed in accordance with examples as disclosed herein. In some examples, aspects of the operations of 1115 may be performed by a provisioning component 635 as described with reference to FIG. 6.

At 1120, the method may include scaling an amount of compute instances provisioned for the design session based at least in part on the provisioning. The operations of 1120 may be performed in accordance with examples as disclosed herein. In some examples, aspects of the operations of 1120 may be performed by a scaling component 655 as described with reference to FIG. 6.

At 1125, the method may include evaluating an integration flow configuration associated with the integration flow, the evaluating based at least in part on the one or more design parameters. The operations of 1125 may be performed in accordance with examples as disclosed herein. In some examples, aspects of the operations of 1125 may be performed by an evaluation component 640 as described with reference to FIG. 6.

At 1130, the method may include terminating the one or more compute instances upon completion of the design session. The operations of 1130 may be performed in accordance with examples as disclosed herein. In some examples, aspects of the operations of 1130 may be performed by a termination component 645 as described with reference to FIG. 6.

Figure 12:
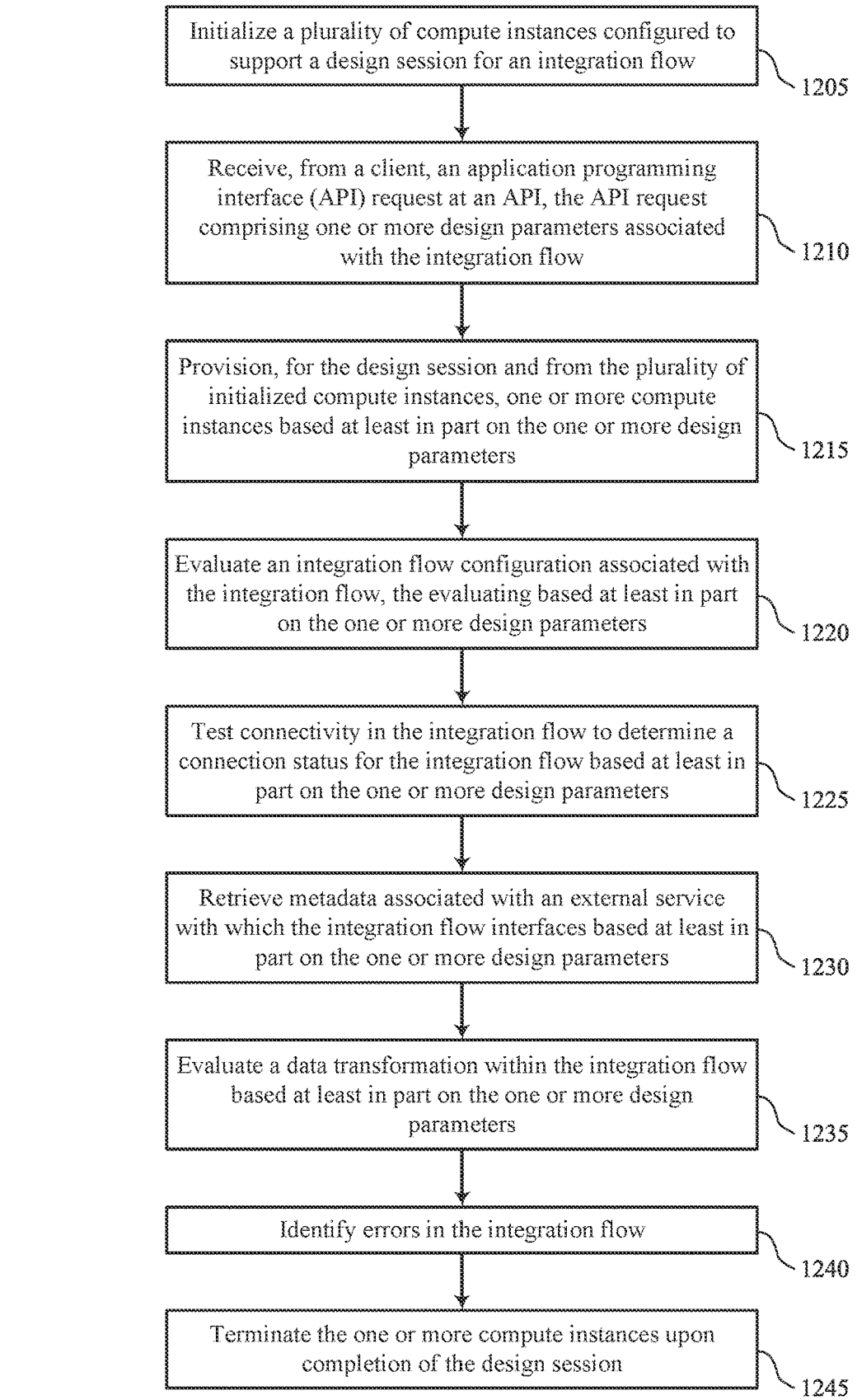

FIG. 12 shows a flowchart illustrating a method 1200 that supports application programming interface for integration flow design in accordance with aspects of the present disclosure. The operations of the method 1200 may be implemented by a database server, an application server, or its components as described herein. For example, the operations of the method 1200 may be performed by a database server or an application server, as described with reference to FIGS. 1 through 7. In some examples, a database server or an application server may execute a set of instructions to control the functional elements of the database server or the application server to perform the described functions. Additionally or alternatively, the database server or the application server may perform aspects of the described functions using special-purpose hardware.

At 1205, the method may include initializing a plurality of compute instances configured to support a design session for an integration flow. The operations of 1205 may be performed in accordance with examples as disclosed herein. In some examples, aspects of the operations of 1205 may be performed by an initialization component 625 as described with reference to FIG. 6.

At 1210, the method may include receiving, from a client, an application programming interface (API) request at an API, the API request comprising one or more design parameters associated with the integration flow. The operations of 1210 may be performed in accordance with examples as disclosed herein. In some examples, aspects of the operations of 1210 may be performed by an API request component 630 as described with reference to FIG. 6.

At 1215, the method may include provisioning, for the design session and from the plurality of initialized compute instances, one or more compute instances based at least in part on the one or more design parameters. The operations of 1215 may be performed in accordance with examples as disclosed herein. In some examples, aspects of the operations of 1215 may be performed by a provisioning component 635 as described with reference to FIG. 6.

At 1220, the method may include evaluating an integration flow configuration associated with the integration flow, the evaluating based at least in part on the one or more design parameters. The operations of 1220 may be performed in accordance with examples as disclosed herein. In some examples, aspects of the operations of 1220 may be performed by an evaluation component 640 as described with reference to FIG. 6.

At 1225, the method may include testing connectivity in the integration flow to determine a connection status for the integration flow based at least in part on the one or more design parameters. The operations of 1225 may be performed in accordance with examples as disclosed herein. In some examples, aspects of the operations of 1225 may be performed by an evaluation component 640 as described with reference to FIG. 6.

At 1230, the method may include retrieving metadata associated with an external service with which the integration flow interfaces based at least in part on the one or more design parameters. The operations of 1230 may be performed in accordance with examples as disclosed herein. In some examples, aspects of the operations of 1230 may be performed by an evaluation component 640 as described with reference to FIG. 6.

At 1235, the method may include evaluating a data transformation within the integration flow based at least in part on the one or more design parameters. The operations of 1235 may be performed in accordance with examples as disclosed herein. In some examples, aspects of the operations of 1235 may be performed by an evaluation component 640 as described with reference to FIG. 6.

At 1240, the method may include identifying errors in the integration flow. The operations of 1240 may be performed in accordance with examples as disclosed herein. In some examples, aspects of the operations of 1240 may be performed by an evaluation component 640 as described with reference to FIG. 6.

At 1245, the method may include terminating the one or more compute instances upon completion of the design session. The operations of 1245 may be performed in accordance with examples as disclosed herein. In some examples, aspects of the operations of 1245 may be performed by a termination component 645 as described with reference to FIG. 6.

A method for data processing at an application server is described. The method may include initializing a plurality of compute instances configured to support a design session for an integration flow, receiving, from a client, an application programming interface (API) request at an API, the API request comprising one or more design parameters associated with the integration flow, provisioning, for the design session and from the plurality of initialized compute instances, one or more compute instances based at least in part on the one or more design parameters, evaluating an integration flow configuration associated with the integration flow, the evaluating based at least in part on the one or more design parameters, and terminating the one or more compute instances upon completion of the design session.

An apparatus for data processing at an application server is described. The apparatus may include a processor, memory coupled with the processor, and instructions stored in the memory. The instructions may be executable by the processor to cause the apparatus to initialize a plurality of compute instances configured to support a design session for an integration flow, receive, from a client, an application programming interface (API) request at an API, the API request comprising one or more design parameters associated with the integration flow, provision, for the design session and from the plurality of initialized compute instances, one or more compute instances based at least in part on the one or more design parameters, evaluate an integration flow configuration associated with the integration flow, the evaluating based at least in part on the one or more design parameters, and terminate the one or more compute instances upon completion of the design session.

Another apparatus for data processing at an application server is described. The apparatus may include means for initializing a plurality of compute instances configured to support a design session for an integration flow, means for receiving, from a client, an application programming interface (API) request at an API, the API request comprising one or more design parameters associated with the integration flow, means for provisioning, for the design session and from the plurality of initialized compute instances, one or more compute instances based at least in part on the one or more design parameters, means for evaluating an integration flow configuration associated with the integration flow, the evaluating based at least in part on the one or more design parameters, and means for terminating the one or more compute instances upon completion of the design session.

A non-transitory computer-readable medium storing code for data processing at an application server is described. The code may include instructions executable by a processor to initialize a plurality of compute instances configured to support a design session for an integration flow, receive, from a client, an application programming interface (API) request at an API, the API request comprising one or more design parameters associated with the integration flow, provision, for the design session and from the plurality of initialized compute instances, one or more compute instances based at least in part on the one or more design parameters, evaluate an integration flow configuration associated with the integration flow, the evaluating based at least in part on the one or more design parameters, and terminate the one or more compute instances upon completion of the design session.

Some examples of the method, apparatuses, and non-transitory computer-readable medium described herein may further include operations, features, means, or instructions for initializing one or more replacement compute instances to replace the one or more terminated compute instances and associating the one or more replacement compute instances with the plurality of compute instances.

Some examples of the method, apparatuses, and non-transitory computer-readable medium described herein may further include operations, features, means, or instructions for determining a minimum number of compute instances to maintain in the plurality of compute instances based at least in part on an initialization time of one or more additional compute instances.

Some examples of the method, apparatuses, and non-transitory computer-readable medium described herein may further include operations, features, means, or instructions for initializing one or more additional compute instances to join the plurality of compute instances based at least in part on the determining.

Some examples of the method, apparatuses, and non-transitory computer-readable medium described herein may further include operations, features, means, or instructions for scaling an amount of compute instances provisioned for the design session based at least in part on the provisioning.

In some examples of the method, apparatuses, and non-transitory computer-readable medium described herein, provisioning, for the design session and from the plurality of initialized compute instances, one or more compute instances may include operations, features, means, or instructions for limiting the number of compute instances provisioned for the design session based at least in part on a number of compute instances in the plurality of compute instances.

Some examples of the method, apparatuses, and non-transitory computer-readable medium described herein may further include operations, features, means, or instructions for determining the one or more provisioned compute instances based at least in part on one or more characteristics of the plurality of compute instances, the one or more design parameters, or both.

In some examples of the method, apparatuses, and non-transitory computer-readable medium described herein, evaluating the integration flow configuration associated with the integration flow may include operations, features, means, or instructions for testing connectivity in the integration flow to determine a connection status for the integration flow based at least in part on the one or more design parameters.

In some examples of the method, apparatuses, and non-transitory computer-readable medium described herein, evaluating the integration flow configuration associated with the integration flow may include operations, features, means, or instructions for retrieving metadata associated with an external service with which the integration flow interfaces based at least in part on the one or more design parameters.

In some examples of the method, apparatuses, and non-transitory computer-readable medium described herein, evaluating the integration flow configuration associated with the integration flow may include operations, features, means, or instructions for evaluating a data transformation within the integration flow based at least in part on the one or more design parameters.

In some examples of the method, apparatuses, and non-transitory computer-readable medium described herein, evaluating the integration flow configuration associated with the integration flow may include operations, features, means, or instructions for determining integration flow metadata in the integration flow based at least in part on the one or more design parameters.

In some examples of the method, apparatuses, and non-transitory computer-readable medium described herein, evaluating the integration flow configuration associated with the integration flow may include operations, features, means, or instructions for identifying errors in the integration flow and reporting the errors to the client.

In some examples of the method, apparatuses, and non-transitory computer-readable medium described herein, identifying errors in the integration flow may include operations, features, means, or instructions for asynchronous debugging, synchronous debugging, or a combination thereof.

In some examples of the method, apparatuses, and non-transitory computer-readable medium described herein, evaluating the integration flow configuration associated with the integration flow may include operations, features, means, or instructions for exposing an API endpoint for testing the integration flow.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at an application server, comprising:
   initializing a plurality of compute instances configured to support a design session for an integration flow;
   receiving, from a client, an application programming interface (API) request at an API, the API request comprising one or more design parameters associated with the integration flow;
   provisioning, for the design session and from the plurality of initialized compute instances, one or more compute instances based at least in part on the one or more design parameters;
   evaluating an integration flow configuration associated with the integration flow, the evaluating based at least in part on the one or more design parameters; and
   terminating the one or more compute instances upon completion of the design session.

2. The method of claim 1, further comprising:
   initializing one or more replacement compute instances to replace the one or more terminated compute instances; and
   associating the one or more replacement compute instances with the plurality of compute instances.

3. The method of claim 1, further comprising:
   determining a minimum quantity of compute instances to maintain in the plurality of compute instances based at least in part on an initialization time of one or more additional compute instances.

4. The method of claim 3, further comprising:
   initializing one or more additional compute instances to join the plurality of compute instances based at least in part on the determining.

5. The method of claim 1, further comprising:
   scaling an amount of compute instances provisioned for the design session based at least in part on the provisioning.

6. The method of claim 1, wherein provisioning, for the design session and from the plurality of initialized compute instances, one or more compute instances comprises:
   limiting the quantity of compute instances provisioned for the design session based at least in part on a quantity of compute instances in the plurality of compute instances.

7. The method of claim 1, further comprising:
   determining the one or more provisioned compute instances based at least in part on one or more characteristics of the plurality of compute instances, the one or more design parameters, or both.

8. The method of claim 1, wherein evaluating the integration flow configuration associated with the integration flow comprises:
   testing connectivity in the integration flow to determine a connection status for the integration flow based at least in part on the one or more design parameters.

9. The method of claim 1, wherein evaluating the integration flow configuration associated with the integration flow comprises:
   retrieving metadata associated with an external service with which the integration flow interfaces based at least in part on the one or more design parameters.

10. The method of claim 1, wherein evaluating the integration flow configuration associated with the integration flow comprises:
   evaluating a data transformation within the integration flow based at least in part on the one or more design parameters.

11. The method of claim 1, wherein evaluating the integration flow configuration associated with the integration flow comprises:
   determining integration flow metadata in the integration flow based at least in part on the one or more design parameters.

12. The method of claim 1, wherein evaluating the integration flow configuration associated with the integration flow comprises:
   exposing an API endpoint for testing the integration flow.

13. The method of claim 1, wherein evaluating the integration flow configuration associated with the integration flow comprises:
   identifying errors in the integration flow; and
   reporting the errors to the client.

14. The method of claim 13, wherein identifying errors in the integration flow comprises:
   asynchronous debugging, synchronous debugging, or a combination thereof.

15. An apparatus for data processing at an application server, comprising:
   a processor;
   memory coupled with the processor; and
   instructions stored in the memory and executable by the processor to cause the apparatus to:
      initialize a plurality of compute instances configured to support a design session for an integration flow;
      receive, from a client, an application programming interface (API) request at an API, the API request comprising one or more design parameters associated with the integration flow;
      provision, for the design session and from the plurality of initialized compute instances, one or more compute instances based at least in part on the one or more design parameters;
      evaluate an integration flow configuration associated with the integration flow, the evaluating based at least in part on the one or more design parameters; and
      terminate the one or more compute instances upon completion of the design session.

16. The apparatus of claim 15, wherein the instructions are further executable by the processor to cause the apparatus to:
   initialize one or more replacement compute instances to replace the one or more terminated compute instances; and
   associate the one or more replacement compute instances with the plurality of compute instances.

17. The apparatus of claim 15, wherein the instructions are further executable by the processor to cause the apparatus to:
   determine a minimum quantity of compute instances to maintain in the plurality of compute instances based at least in part on an initialization time of one or more additional compute instances.

18. The apparatus of claim 15, wherein the instructions are further executable by the processor to cause the apparatus to:
   scale an amount of compute instances provisioned for the design session based at least in part on the provisioning.

19. A non-transitory computer-readable medium storing code for data processing at an application server, the code comprising instructions executable by a processor to:
   initialize a plurality of compute instances configured to support a design session for an integration flow;
   receive, from a client, an application programming interface (API) request at an API, the API request comprising one or more design parameters associated with the integration flow;
   provision, for the design session and from the plurality of initialized compute instances, one or more compute instances based at least in part on the one or more design parameters;
   evaluate an integration flow configuration associated with the integration flow, the evaluating based at least in part on the one or more design parameters; and
   terminate the one or more compute instances upon completion of the design session.

20. The non-transitory computer-readable medium of claim 19, wherein the instructions are further executable by the processor to:
   initialize one or more replacement compute instances to replace the one or more terminated compute instances; and
   associate the one or more replacement compute instances with the plurality of compute instances.

* * * * *